US010895657B2

(12) United States Patent
Dorrough et al.

(10) Patent No.: US 10,895,657 B2
(45) Date of Patent: Jan. 19, 2021

(54) APPARATUS AND METHODS FOR OBSCURED FEATURE DETECTION WITH UNIFORM ELECTRIC FIELDS

(71) Applicant: FRANKLIN SENSORS INC., Boise, ID (US)

(72) Inventors: David M. Dorrough, Eagle, ID (US); Daniel Scott Toborg, Bellevue, WA (US)

(73) Assignee: Franklin Sensors Inc., Boise, ID (US)

( * ) Notice: Subject to any disclaimer, the term of this patent is extended or adjusted under 35 U.S.C. 154(b) by 0 days.

(21) Appl. No.: 15/406,322

(22) Filed: Jan. 13, 2017

(65) Prior Publication Data

US 2018/0203149 A1    Jul. 19, 2018

(51) Int. Cl.
*G01V 3/08* (2006.01)

(52) U.S. Cl.
CPC .................................. *G01V 3/088* (2013.01)

(58) Field of Classification Search
CPC ...................................................... G01V 3/088
See application file for complete search history.

(56) References Cited

U.S. PATENT DOCUMENTS

| 4,177,421 A | 12/1979 | Thornburg |
| 5,247,261 A | 9/1993 | Gershenfeld |
| RE34,741 E | 9/1994 | Andermo |
| 5,900,550 A | 5/1999 | Menzel |
| 6,198,271 B1 | 3/2001 | Heger et al. |
| 6,215,293 B1 | 4/2001 | Yim |
| 6,867,602 B2 | 3/2005 | Davis et al. |
| 7,116,091 B2 | 10/2006 | Miller |
| 7,504,817 B2 | 3/2009 | Sanoner et al. |
| 7,839,282 B1* | 11/2010 | Mathur ............... G01D 5/2405 340/562 |
| 8,041,083 B2 | 10/2011 | Pai et al. |
| 8,669,772 B2 | 3/2014 | Dorrough |

(Continued)

FOREIGN PATENT DOCUMENTS

| DE | 3600446 A1 | 7/1987 |
| DE | 102004007314 A1 | 8/2005 |

(Continued)

OTHER PUBLICATIONS

Kapazitäten mit einem Sigma-Delta-Wandler messen (Measuring capacitance with a sigma-delta converter), Michal Brychta und Paul Löser, in "elektronik industrie 3— 2005".

(Continued)

*Primary Examiner* — Tung X Nguyen
*Assistant Examiner* — Feba Pothen
(74) *Attorney, Agent, or Firm* — Stoel Rives LLP; R. Whitney Johnson; Andrew C. Wasden

(57) ABSTRACT

Obscured feature detectors and methods of detecting obscured features are disclosed. An obscured feature detector can include a plurality of sensor plates and a common plate. The sensor plates may be arranged linearly to form a sensor array. The common plate may extend along the sensor array and have a length that is shortened. A controller is coupled to the sensing circuit to analyze the capacitances measured by the sensing circuit. One or a plurality of indicators are coupled to the controller, and can be selectively set to identify a location of an obscured feature behind a surface.

25 Claims, 16 Drawing Sheets

(56) References Cited

U.S. PATENT DOCUMENTS

| | | |
|---|---|---|
| 8,836,347 B2 | 9/2014 | Dorrough |
| 9,903,975 B1* | 2/2018 | Smoot .................... G01V 3/38 |
| 2003/0201783 A1 | 10/2003 | Steber et al. |
| 2004/0095151 A1* | 5/2004 | Schmidt ................ G01V 3/088 324/686 |
| 2005/0194959 A1 | 9/2005 | Miller |
| 2006/0076985 A1* | 4/2006 | Martinez ............. H03K 17/955 327/110 |
| 2008/0238403 A1 | 10/2008 | Sanoner et al. |
| 2009/0039899 A1 | 2/2009 | Bassani et al. |
| 2011/0215814 A1 | 9/2011 | Dorrough |
| 2011/0215822 A1 | 9/2011 | Dorrough |
| 2011/0309572 A1 | 12/2011 | Miyamoto |
| 2012/0212241 A1* | 8/2012 | Wallace .............. A63F 3/00643 324/686 |
| 2016/0061630 A1 | 3/2016 | Aussertechner et al. |
| 2016/0377758 A1 | 12/2016 | Dorrough |
| 2017/0254633 A1 | 9/2017 | Tanahashi et al. |
| 2018/0313968 A1 | 11/2018 | Dorrough et al. |
| 2018/0335460 A1 | 11/2018 | Streett et al. |
| 2019/0219721 A1 | 7/2019 | Dorrough et al. |

FOREIGN PATENT DOCUMENTS

| | | |
|---|---|---|
| DE | 202007002776 U1 | 6/2007 |
| DE | 102008054447 A1 | 6/2010 |
| EP | 0506605 A1 | 9/1992 |
| EP | 0952465 A2 | 10/1999 |
| EP | 2196828 A1 | 6/2010 |
| WO | 2007051780 A1 | 5/2007 |
| WO | 2007141062 A1 | 12/2007 |
| WO | 2009111518 A1 | 9/2009 |
| WO | 2010066659 A2 | 6/2010 |
| WO | 2011138084 A1 | 11/2011 |

OTHER PUBLICATIONS

"Evaluation of Methods for Ground Bounce Removal in GPR Utility Mapping", Sigve Tjora, Egil Eide, Tenth International Conference on Ground Penetration Radar, Jun. 21-24, 2004, Delft, The Netherlands.

International Search Report and Written Opinion dated Sep. 8, 2017 for PCT/US2017/040901.

International Search Report and Written Opinion for PCT/US2017/040857, dated Sep. 14, 2017.

Non-final Office Action dated Mar. 7, 2018 for U.S. Appl. No. 15/136,570.

Dorrough, et al., Office Action dated Mar. 21, 2019 for U.S. Appl. No. 15/499,701.

Dorrough, et al., Notice of Allowance dated Dec. 5, 2018 for U.S. Appl. No. 15/136,570 ,dated Dec. 5, 2018 ,7 pages.

Dorrough , et al., Office Action dated Aug. 20, 2019 for U.S. Appl. No. 16/360,913.

Dorrough , et al., Notice of Allowance dated Aug. 7, 2019 for U.S. Appl. No. 15/499,701.

International Search Report and Written Opinion dated Jun. 23, 2020 for international application PCT/US2020/023714.

Dorrough , et al., Notice of Allowance dated Jan. 22, 2020 for U.S. Appl. No. 16/360,913.

Dorrough , et al., Notice of Allowance dated Nov. 27, 2019 for U.S. Appl. No. 15/499,701.

* cited by examiner

APPARATUS AND METHODS FOR OBSCURED FEATURE DETECTION WITH UNIFORM ELECTRIC FIELDS

TECHNICAL FIELD

The present disclosure relates generally to devices to detect a presence of obscured features behind opaque, solid surfaces, and more specifically to devices to locate beams and studs behind walls and joists beneath floors.

BACKGROUND

Locating obscured features such as beams, studs, joists and other elements behind walls and beneath floors is a common problem encountered during construction, repair and home improvement activities. For example, often a desire arises to cut or drill into a wall, floor, or other supported surface with the aim of creating an opening in the surface while avoiding the underlying support elements. In these instances, knowing where the support elements are positioned before beginning can be desirable so as to avoid cutting or drilling into the support elements. On other occasions, one may desire to anchor a heavy object such as a picture or shelf to a support element obscured by a supported surface. In these cases, it is often desirable to install a fastener through the supported surface in alignment with an underlying support element. However, with the wall, floor or supported surface in place, the location of the support element is not visually detectable.

A variety of rudimentary techniques have been employed in the past with limited success to address the problem of locating underlying features obscured by an overlying surface. These techniques include driving small pilot nails through various locations in the overlying surface until an underlying support element is encountered and then covering over holes in the surface that did not reveal the location of the underlying support element. A less destructive technique comprises tapping on the overlying surface with the aim of detecting audible changes in the sound which emanates from the surface when there is a support element beneath or behind the area of the surface being tapped. This technique is ineffective, however, because the accuracy of the results depends greatly on the judgment and skill of the person tapping and listening to search for the underlying support element, and because the sound emitted by the tapping is heavily influenced by the type and density of the surface being examined.

Magnetic detectors have also been employed to find obscured support elements with the detector relying on the presence of metallic fasteners, such as nails or screws, in the wall and support element to trigger a response in the detector. However, since metallic fasteners are spaced at discrete locations along the length of a support, a magnetic detector may pass over a length of the support where no fasteners are located, thereby failing to detect the presence of the obscured support element.

Electronic sensors have also been employed to detect obscured features behind opaque surfaces. These detectors sense changes in capacitance on the examined surface that result from the presence of features positioned behind, beneath or within the surface. These changes in capacitance are detectable through a variety of surfaces such as wood, sheet-rock, plaster and gypsum and do not rely on the presence of metal fasteners in the surface or obscured feature for activation of the sensor. However, conventional electronic detectors may suffer from a significant shortcoming. Conventional obscured feature detectors may have difficulty accurately compensating for the thickness and density of the detected surface, which negatively impact accuracy.

SUMMARY

The present disclosure advantageously addresses one or more of the aforementioned deficiencies in the field of obscured feature detection by providing an accurate, simple to use and inexpensively manufactured obscured feature detector. The detector can be employed by placing the device against the examined surface and reading the location of all features present beneath the surface where the device is positioned. The detector is able to accurately read through different surface materials and different surface thicknesses.

Additional aspects and advantages will be apparent from the following detailed description of preferred embodiments, which proceeds with reference to the accompanying drawings.

In the following description, reference is made to the accompanying drawings that form a part thereof, and in which is shown by way of illustration specific exemplary embodiments in which the invention may be practiced. These embodiments are described in sufficient detail to enable those skilled in the art to practice the technology and embodiments described herein, and it is to be understood that modifications to the various disclosed embodiments may be made, and other embodiments may be utilized, without departing from the spirit and scope of the present disclosure. The following detailed description is, therefore, not to be taken in a limiting sense.

DETAILED DESCRIPTION

Many presently available stud finders (e.g., obscured feature detectors) use capacitance to detect obscured features behind a surface. Capacitance is an electrical measure of an object's ability to hold or store charge. A common form of an energy storage device is the parallel plate capacitor whose capacitance is approximated by: $C = \in r \in o A/d$, where A is the overlapping area of the parallel plates, d is the distance between the plates, $\in r$ is the relative static permittivity (or dielectric constant of the material between the plates), and $\in o$ is a constant. A dielectric material is an electrical insulator that can be polarized by applying an electric field. When a dielectric is placed in an electric field, the molecules shift from their average equilibrium positions causing dielectric polarizations. Because of dielectric polarizations, positive charges are shifted toward the negative edge of the field, and negative charges shift in the opposite direction.

The dielectric constant ($\in r$) of air is one, while most solid non-conductive materials have a dielectric constant greater than one. Generally, it is the variations in the dielectric constants of non-conductive solids that enable conventional capacitive sensors to work.

When the sensor plates on an obscured feature detector are placed on a wall at a location with no support behind the wall, the detector measures the capacitance of the wall and the air behind it. When placed in a position having a support behind the wall, the detector then measures the capacitance of the wall and the support, which has a higher dielectric constant than air. As a consequence, the detector registers an increase in capacitance which can then be used to trigger an indicating system.

Figure 10:
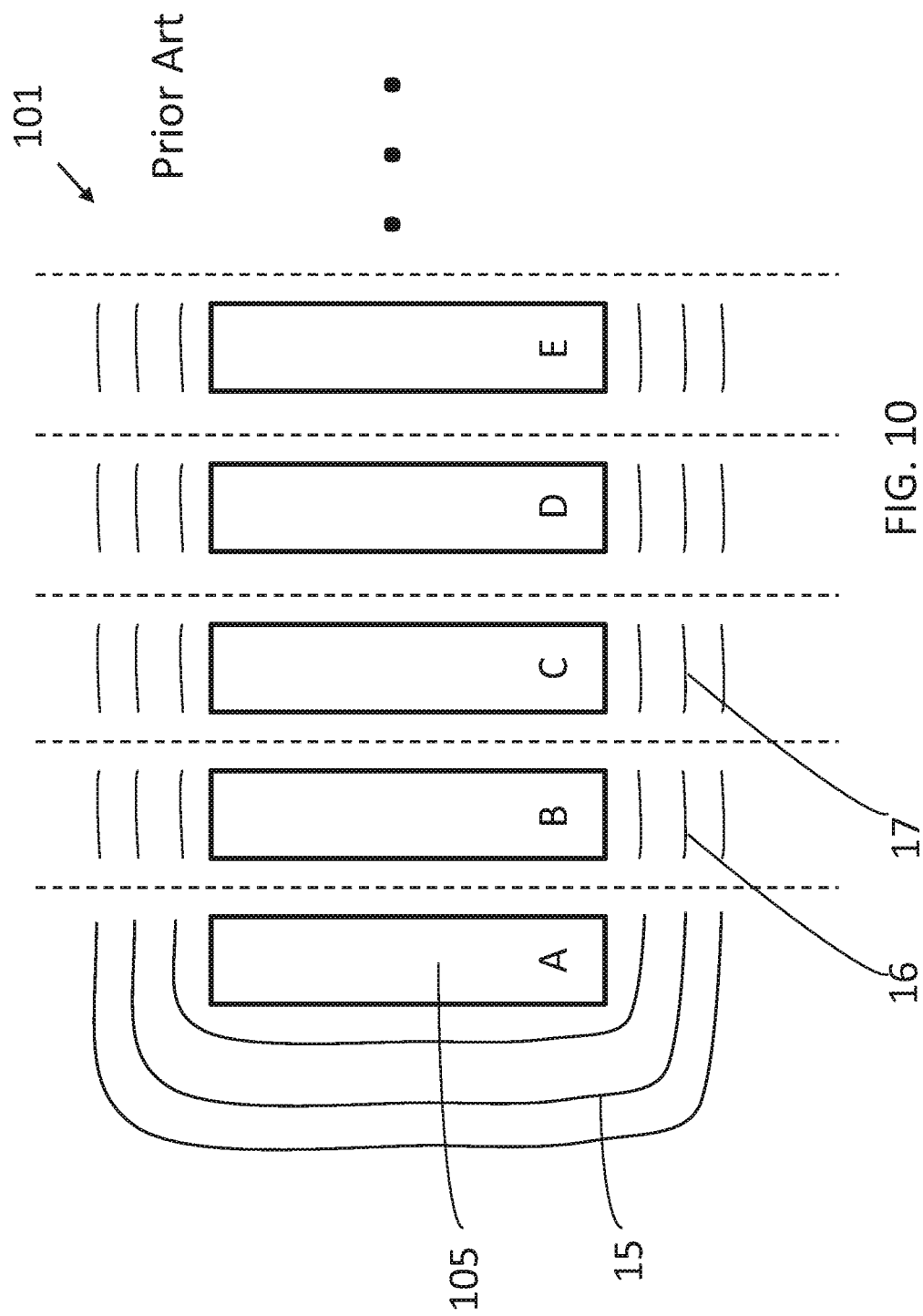
FIG. 10 shows an elevation view of a bottom surface of a prior art obscured feature detector, illustrating the primary sensing field zones for several sensor plates.

In presently available obscured feature detectors a set of identical sensor plates are typically arranged in a linear fashion (see, e.g., FIG. 10). Each of the sensor plates performs a sensor reading of the surface. The sensor readings are then compared. The sensor plates that have the highest sensor readings are interpreted to be the locations of obscured features. However, sensor plates that are near the ends of the group may not respond to obscured features in the same manner as the plates that are near the center. This issue may be particularly evident when the obscured feature detector is moved from a thinner, or less dense, surface to a thicker, or more dense, surface.

Ideally each of the sensor plates on a thicker surface would have similar sensor readings to each other, because the sensor plates are all on the same surface, with no obscured features present. However, the sensor readings of the sensor plates near the ends may see a larger reading increase than the sensor plates near the center. The sensor plates that are at the ends are alone in creating the electric fields that are beyond the group of sensor plates. As a result, the sensor plates near the end may respond with a disproportionately higher reading when placed on a thicker surface. Accordingly, the controller may have difficulty determining if the elevated sensor readings are due to the presence of an obscured feature, or due to the detector being placed on a thicker surface. This disclosure provides a solution.

In obscured feature detectors with multiple sensor plates it is desirable for each sensor plate to have a similar response to the same obscured feature. To ensure a similar response from each sensor plate, proper geometric shape and arrangement of the sensor plates can ensure an equivalent response to an obscured feature. Improved shielding of sensor plate traces may also improve performance. In addition, enhanced electrical coupling of the user to the sensing circuit may provide improved performance. Also a mechanism to ensure that the sensor plates are flat against the surface may improve performance.

The present disclosure is directed to obscured feature detectors and methods of detecting obscured feature detectors. In the exemplary embodiments, an obscured feature detector comprises a group of sensor plates, a multi-layer printed circuit board (PCB), a sensing circuit, a controller, a display circuit, a power controller, and/or a housing.

The disclosed embodiments help maintain uniform or near uniform electric field lines generated by the group of sensor plates. Specifically, the electric field of two end sensor plates in the group of sensor plates is similar to the electric field of the non-end sensor plates. The electric fields produced by the end sensor plates and the non-end sensor plates may be oriented transverse relative to each other.

The disclosed embodiments enable more accurate identification of a location of an obscured feature. The disclosed embodiments can also instantly and accurately read through a variety of surfaces with different dielectric constants. In addition the presently disclosed embodiments improve ability to instantly and accurately read through a variety of surface thicknesses.

The disclosed embodiments also create a detector that is easier to use. Many prior art detectors require more steps, and more time and more proficiency, in order to recalibrate the unit to different surfaces to determine the locations of obscured features. The disclosed embodiments provide more reliable sensor readings. The sensor readings from the sensor plates self-adjust to the detected surface and provide a more reliable reading and have the ability to detect features more deeply. The sensor readings have significantly less surface-thickness-induced reading error. With this reading error removed, The disclosed embodiments can detect objects more deeply.

The present disclosure will now be described more fully with reference to the accompanying drawings. This disclosure may, however, be embodied in many different forms and should not be construed as limited to the embodiments set forth herein; rather, these embodiments are provided by way of illustration only so that this disclosure will be thorough, and fully convey the full scope to those skilled in the art.

Figure 1:
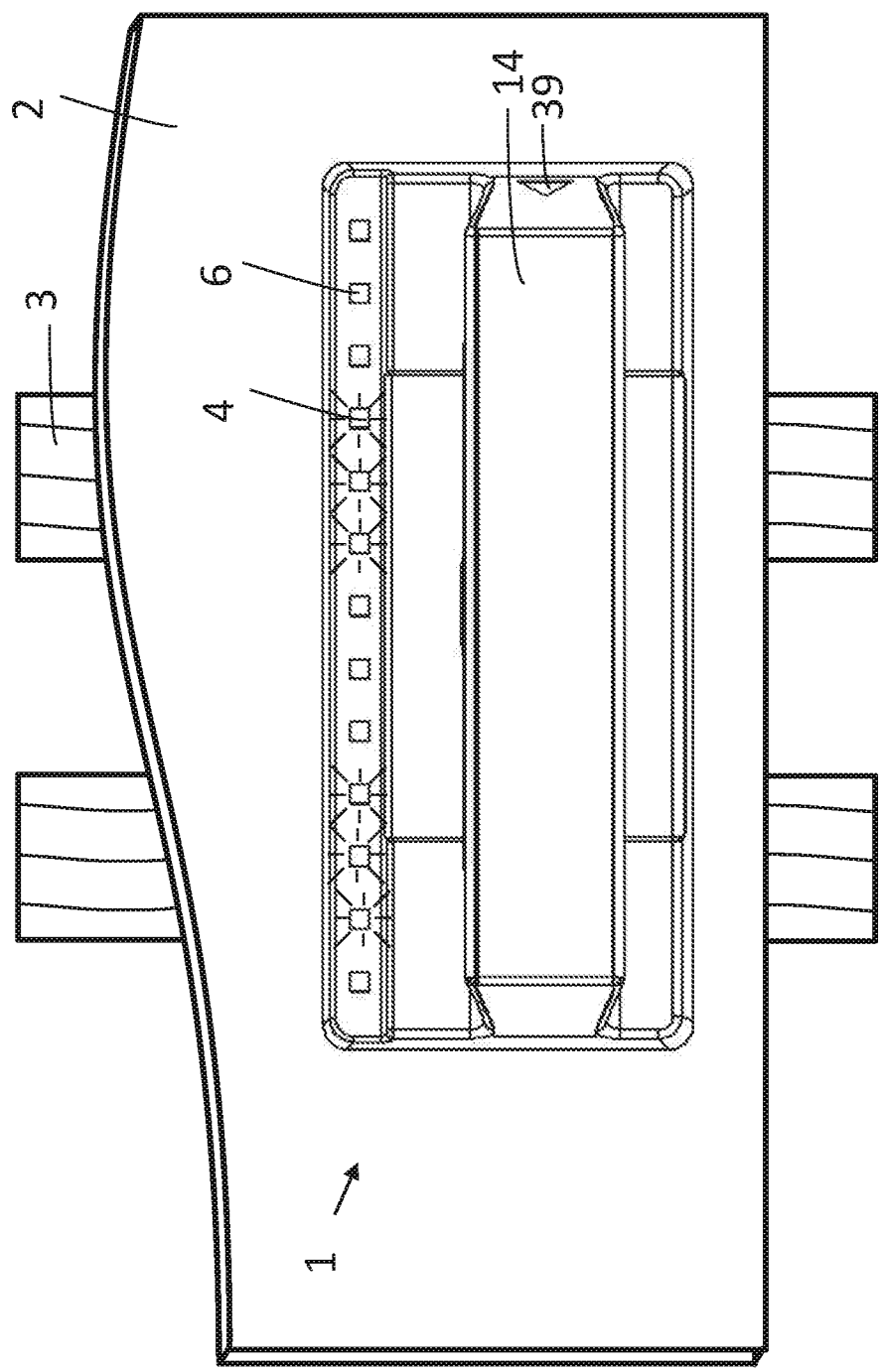
FIG. 1 illustrates an advanced obscured feature detector, according to one embodiment, placed on a piece of sheetrock and detecting an obscured feature.
Figure 2:
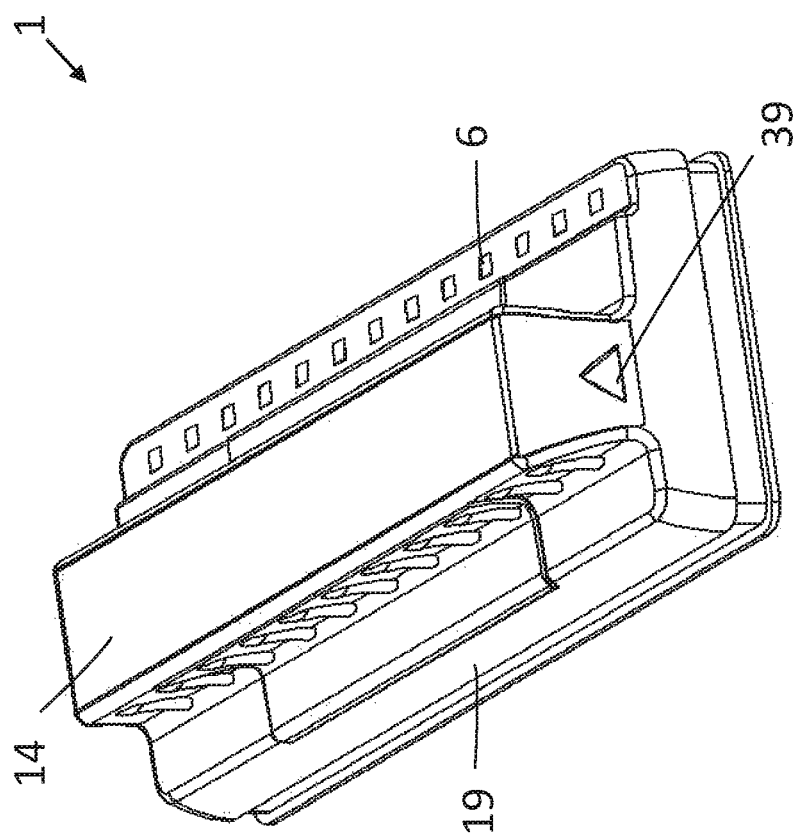
FIG. 2 is a perspective view of the obscured feature detector of FIG. 1.
Figure 3:
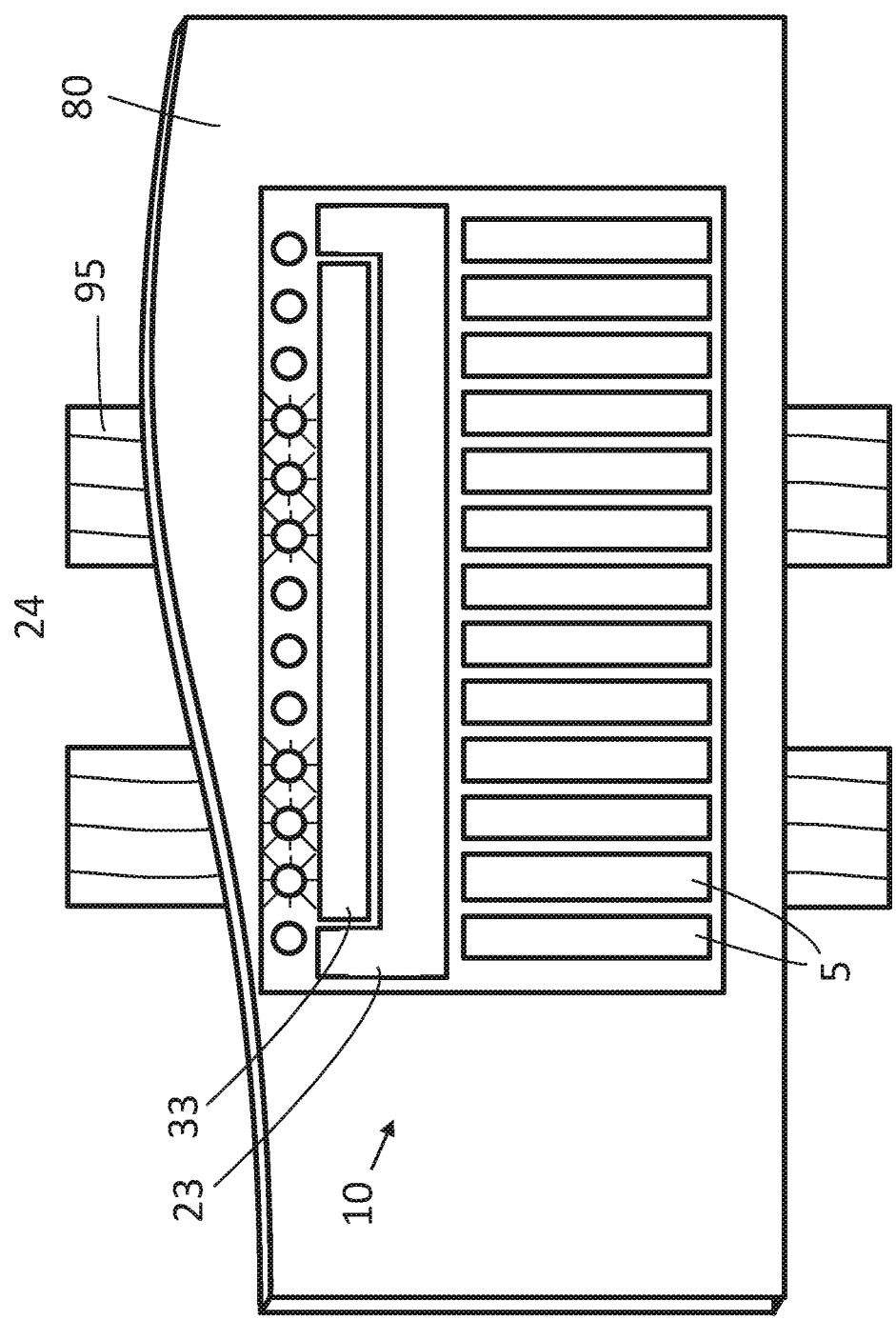
FIG. 3 is an illustrative drawing that shows sensor plates and activated indicators of the obscured feature detector of FIG. 1, with the activated indicators signaling a position of the hidden obscured feature 3.

FIG. 1 illustrates an obscured feature detector 1, according to one embodiment, placed on a piece of sheetrock 2 (or similar surface) and detecting an obscured feature 3. FIG. 2 is a perspective view of the obscured feature detector 1 of FIG. 1. FIG. 3 shows a sensor side of the obscured feature detector 1, which includes a plurality of sensor plates 5 and a shortened common plate 33.

With reference to FIGS. 1-3, generally and collectively, the obscured feature detector 1 includes three or more sensor plates 5, a sensing circuit (see FIG. 4), one or more indicators 6, one or more proximity indicators 39, and a housing 19 to provide or otherwise accommodate a handle 14, an active shield plate 23, and a battery cover 28.

The three or more sensor plates 5 each can take a sensor reading that varies based on a proximity of the sensor plate 5 to one or more surrounding objects and on a material property of each of the one or more surrounding objects. The three or more sensor plates 5 may collectively create a sensing field. Each individual sensor plate 5 of the three or more sensor plates 5 may create a corresponding primary sensing field zone that may be a geometric three-dimensional volume within the sensing field where the individual sensor plate 5 contributes more strongly to the sensing field than any other of the three or more sensor plates 5. The three or more sensor plates 5 may all create primary sensing field zones that are geometrically similar. The sensing circuit may couple to the three or more sensor plates 5 to measure the sensor readings of the three or more sensor plates 5.

Each sensor plate 5 forms a first end of a corresponding electric field. The electric field is produced or received at the sensor plates 5. An area on the common plate 33 may form a second end of the corresponding electric field of each sensor plate 5. The common plate 33 has a length extending along one side of each of the sensor plates 5. The length of the common plate 33 is less than a collective linear dimension of the sensor plates 5. In some embodiments, the common plate 33 is coupled to a non-changing voltage. In some embodiments the common plate 33 is coupled to the circuit ground. In some embodiments the common plate 33 is coupled to an alternating signal.

In some embodiments each sensor plate 5 may be part of a group 7 or array of sensor plates 5. Each group 7 may include two or more sensor plates 5 and may also include an active shield plate 23. The sensor plates 5 and active shield plate 23 may be on different planes. Nevertheless if they are driven simultaneously, in some embodiments, they may be part of the same group 7 of sensor plates 5. Each sensor plate 5 has a geometry that is defined by its shape. Each sensor plate 5 also has a perimeter. In some embodiments the perimeter may be composed of multiple segments. In some embodiments each segment of the perimeter is either an internal border 10, or an external border 11. In some embodiments, if a sensor plate 5 has a segment of the perimeter that is adjacent to the perimeter of the group 7, then said segment comprises an external border 11. In some embodiments, if a sensor plate 5 has a segment of the perimeter that is not adjacent to the perimeter of the group 7, then said segment comprises an internal border 10.

In some embodiments to sense the location of an obscured feature 3, a sensor plate 5 may be driven with a current source, and the obscured feature detector 1 measures the time it takes for the sensor plate 5 to reach a certain threshold voltage, thereby achieving a sensor reading. In other embodiments a charge-share mechanism is used to achieve a sensor reading. In other embodiments a radio frequency signal is placed on the sensor plates 5 to achieve a sensor reading. In each of these embodiments a signal is driven on the sensor plate(s) 5 to be sensed.

In some embodiments, only a single sensor plate 5 may be driven at a time. In these embodiments the single sensor plate 5 may be alone in creating the sensing field.

In some embodiments, a group 7 of sensor plates 5 may all be driven with the same signal simultaneously. In these embodiments the group 7 of sensor plates 5 may create the sensing field. In some embodiments multiple sensor plates 5 may be driven simultaneously each with the same signal, although possibly only a single sensor plate 5 may be sensed. Advantageously driving multiple sensor plates 5 simultaneously may create field lines that go deeper into an obscured surface than may be possible if only a single sensor plate 5 is driven. Deeper field lines may make it possible to sense more deeply. In some embodiments a group 7 of sensor plates 5 and an active shield plate 23 may all be driven with the same signal simultaneously, which together would create the sensing field.

Each sensor plate 5 has a primary sensing field zone. In some embodiments the primary sensing field zone is a geometric three-dimensional volume of the sensing field and associated field lines where the individual sensor plate 5 is able to sense more strongly than the active shield plate 23 (if present), or any other sensor plate 5. In some embodiments it is desirable for each sensor plate 5 to have similar primary sensing field zones. In some embodiments it is desirable for each sensor plate 5 to have primary sensing field zones that are geometrically similar and to have similar sensing fields within their respective primary sensing field zones.

FIG. 3 illustrates thirteen sensor plates 5 arranged linearly to form a sensor array 7. Each of the sensor plates 5 is rectangular. Each sensor plate is configured to take a sensor reading that varies based on the proximity of the sensor plate 5 to one or more surrounding objects and on a material property of each of the one or more surrounding objects.

In some embodiments, as shown in FIG. 3, the sensor array 7 may comprise sensor plates 5 that each have a similar geometry. In some embodiments the distance between adjacent sensor plates 5 may be approximately 2.0 mm. As shown, a shortened common plate 33 extends along the sensor array 7 along one side of each of the sensor plates 5. The length of the shortened common plate 33 is less than the collective linear dimension of the sensor array 7. In some embodiments, the shortened common plate 33 may not extend along a side of one or both of the end sensor plates.

In FIG. 3 a sensing field may be created collectively by the sensor plates 5. In some embodiments an active shield plate 23 may contribute to the sensing field. In the embodiment of FIG. 3 each of the sensor plates 5 may have similar primary sensing field zones. In this embodiment, the shortened common plate 33 causes each sensor plate 5 to have primary sensing zones that are geometrically similar as explained in more detail with reference to FIGS. 12, 15, and 16. Likewise, each of the sensor plates 5 may also have similar sensing fields within their respective primary sensing field zones. As a result, an obscured feature detector 1 that is built with a configuration of FIG. 3 may offer improved performance. When the obscured feature detector 1 is moved from a thin surface to a thicker surface the sensor readings for each of the sensor plates 5 may have a similar increase in value.

In some embodiments a sawtooth-shape border or perimeter may have the same effective border as a straight-line border that does not have a sawtooth. In some embodiments a border with a very slight curve may have the same effective border as a straight-line border that does not have a slight curve. In some embodiments a sensor plate 5 with a slot in it has the same effective geometry as an otherwise equivalent sensor plate 5 without a slot. In some embodiments a sensor plate 5 with a small hole in it may have the same effective geometry as an equivalent sensor plate 5 without a hole. Many other geometries are possible that may be effectively equivalent to other substantially equivalent geometries. Many other borders are possible that may effectively be equivalent to other substantially equivalent borders. If a geometry or a border has a property that is effectively equivalent to another geometry or border, then the two may be considered to be similar.

In some embodiments a group 7 of sensor plates 5 is configured such that each sensor plate 5 in the group 7 has the same geometry. In some embodiments each of the sensor plates 5 in the group 7 is radially symmetrical.

The plurality of indicators 6 may be toggled between a deactivated state and an activated state to indicate a location of a region of relative high sensor reading. Activated indicators 4 can indicate the position of the obscured feature 3. Proximity indicators 39 can indicate that the obscured feature detector 1 may be near the obscured feature 3.

In FIGS. 1-3, the indicators 6 are positioned on a layer above the sensor plates 5. In some embodiments there may be an active shield plate 23 between the sensor plates 5 and the indicators 6 so that the indicators 6 do not interfere with the function of the sensor plates 5. In some embodiments it may be desirable to position the indicators 6 on a layer above the sensor plates 5.

In some embodiments, a layer of protective material is mounted to the bottom of the obscured feature detector housing, such that there is a layer of protective material between the surface 2 and the obscured feature detector 1. In some embodiments, the protective material has the interior substantially filled such that it is substantially free from cavities. In some embodiments the protective material is unlike felt, Velcro, cloth, or other materials that have an interior with cavities. The layer of protective material may serve the purpose of protecting the bottom of the obscured feature detector 1 from damage due to knocks, bumps, and wear-and-tear. The protective material could be made from a solid piece of material, such as plastic or other solid non-conductive materials. A solid layer of plastic may provide a low friction surface that would allow the obscured feature detector 1 to slide across the wall. Although some embodiments of the obscured feature detector 1 do not require sliding to operate, a low friction surface may be useful to some users that may choose to move the obscured feature detector 1 from position to position by sliding it.

The protective layer of plastic may be mounted with a pressure sensitive adhesive, glue, or other means. The layer of protective material may be a complete layer that covers the entire surface; it may be rectangular strips, round pieces, or other layers of plastic with other geometries.

A protective material that is substantially filled such that it is substantially free from cavities may build up less static charge than prior art solutions and may advantageously provide for more consistent sensor readings.

In some embodiments the protective material is UHMW-PE (Ultra-High Molecular Weight Polyethylene). UHMW-PE has a low coefficient of friction. UHMW-PE also absorbs very little moisture which may provide increased immunity from changes in humidity, and may provide enhanced immunity from changes in humidity.

Figure 4:
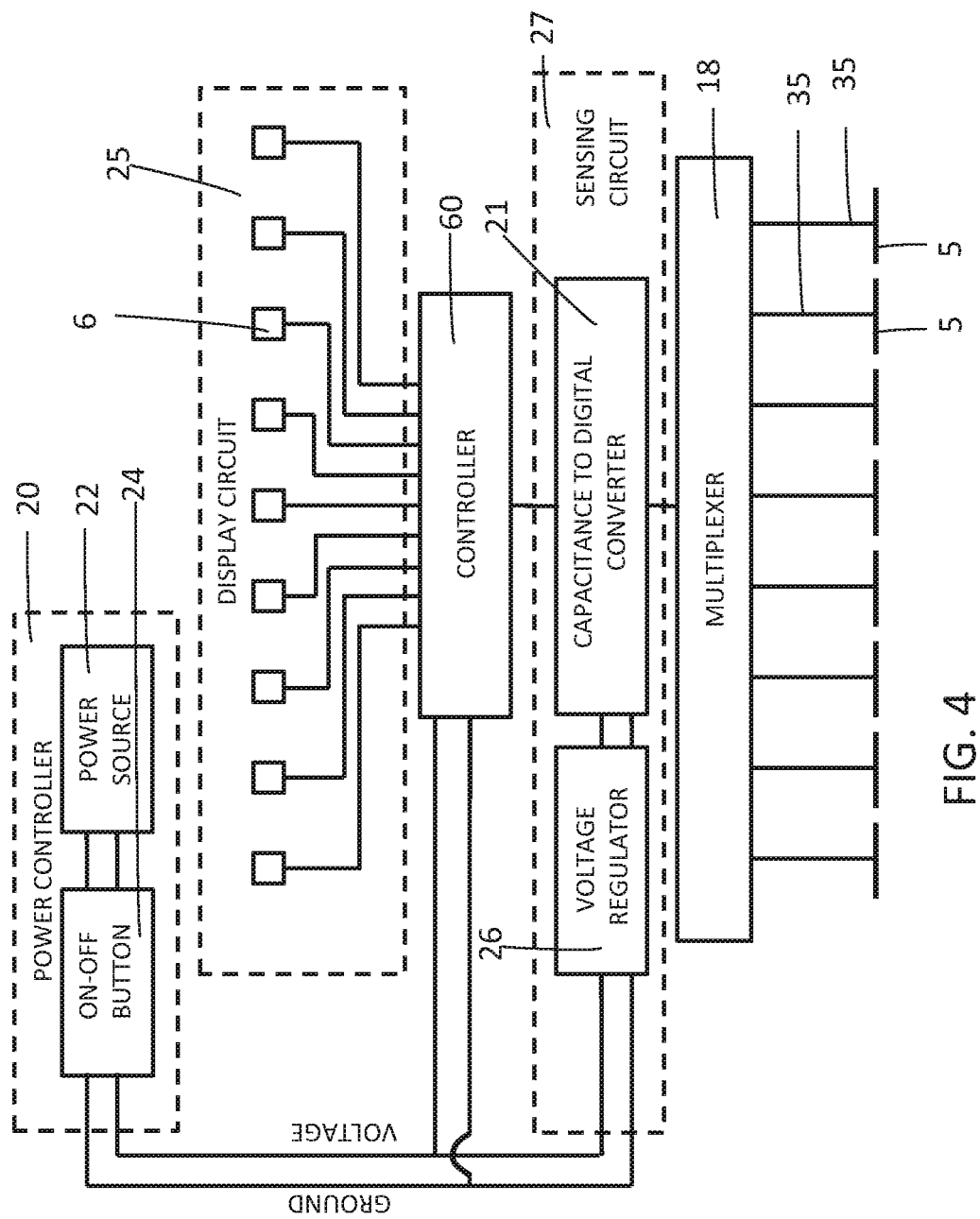
FIG. 4 is a diagram of a circuit of an obscured feature detector, according to one embodiment.

FIG. 4 is a diagram of a circuit of an obscured feature detector 1, according to one embodiment. The circuit includes a multiplexer 18, a power controller 20, a display circuit 25, a sensing circuit 27, and a controller 60.

The power controller 20 may include a power source 22 and an on-off button 24. The power source 22 can comprise an energy source for powering the indicators 6 and supplying power to a capacitance-to-digital converter 21, and a controller 60. In some embodiments, the power source 22 can comprise a DC battery supply. The on-off switch 24 can be used to activate the controller 60 and other components of the obscured feature detector 1. In some embodiments, the on-off switch 24 comprises a push-button mechanism that activates components of the obscured feature detector 1 for a selected time period. In some embodiments the push button activates the components such that the components remain activated until the button is released. In some embodiments the on-off switch 24 comprises a capacitive sensor that can sense the presence of a finger or thumb over the button. In some embodiments, the on-off switch 24 can comprise a toggle switch, or other types of buttons or switches.

The display circuit 25 may include one or more indicators 6 that are electronically coupled to the controller 60.

The sensing circuit 27 may include a voltage regulator 26 and the capacitance-to-digital converter 21. In some embodiments, as shown in FIG. 4, the sensing circuit 27 comprises a plurality of sensors, the voltage regulator 26, and the capacitance-to-digital converter 21. The voltage regulator 26 may be used to condition the output of the power controller 20, as desired. In some embodiments the voltage regulator 26 is placed as near as possible to the capacitance-to-digital converter 21, which may provide a better power source 22 to the capacitance-to-digital converter 21. The sensing circuit 27 can be electrically coupled to the controller 60. One or more sensor plate traces 35, or electrically conductive paths on the PCB, may connect the individual sensor plates 5 to the capacitance-to-digital converter 21. The connection of the sensor plates 5 to the capacitance-to-digital converter 21 may be made via the multiplexer 18. The multiplexer 18 can individually connect the sensor plates 5 to the capacitance-to-digital converter 21.

In some embodiments the multiplexer 18 may connect a single sensor plate 5 to the sensing circuit 27. In some embodiments, the multiplexer 18 may connect more than one adjacent sensor plate 5 to the sensing circuit 27. In some embodiments, the multiplexer 18 may connect more than one non-adjacent sensor plate 5 to the sensing circuit 27. In some embodiments, the multiplexer 18 is configured so that the sensing circuit 27 measures the capacitance of one sensor plate 5. In some embodiments, the multiplexer 18 is configured so that the sensing circuit 27 measures the aggregate capacitance of two or more sensor plates 5.

Each individual sensor plate 5 of a group 7 can be independently connected to the capacitance-to-digital converter 21 via the multiplexer 18. In some embodiments, the group 7 itself is comprised of layers of copper on a PCB.

Figure 6:
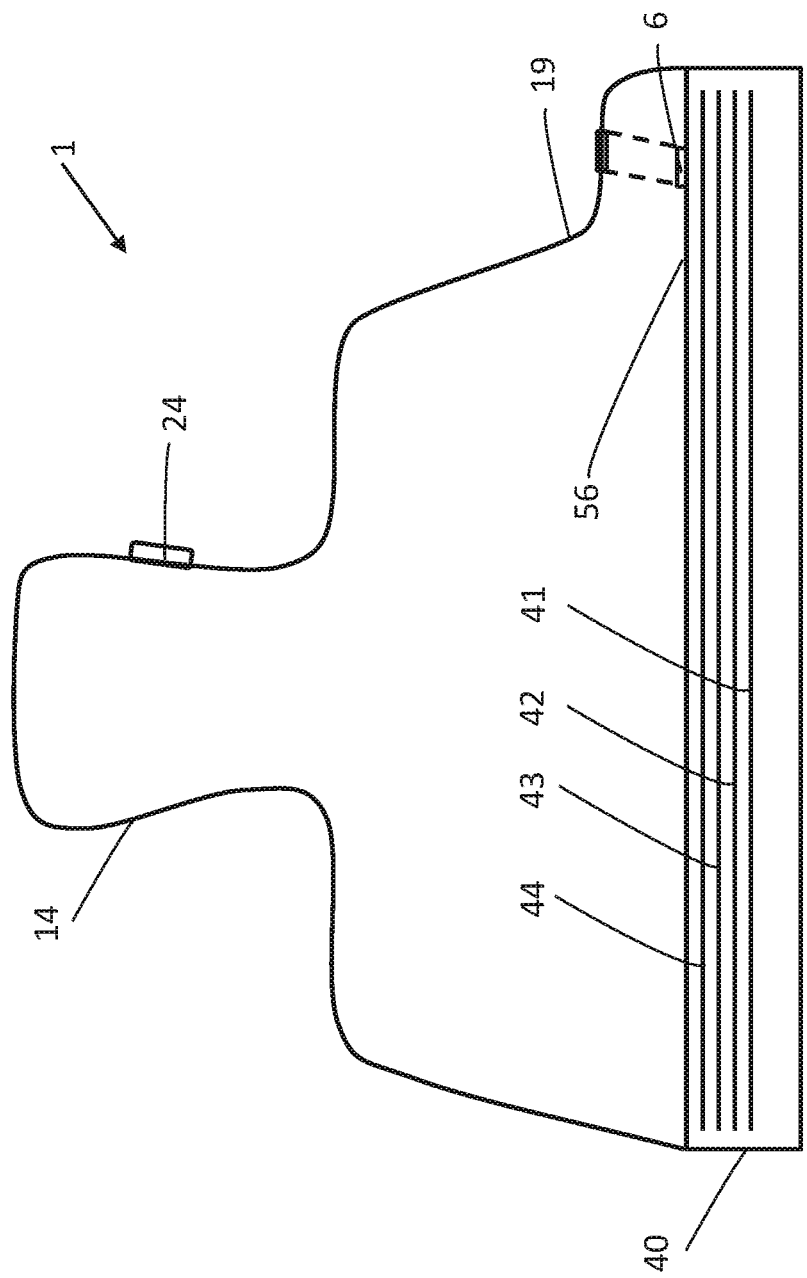
FIG. 6 is a cross-sectional view of an obscured feature detector, according to one embodiment, including a housing, with light pipes and a button, and a printed circuit board.

In some embodiments a two-layer PCB is configured as a sensor plate board 40 (see FIG. 6). In some embodiments a first layer of the sensor plate board 40 comprises the sensor plates 5, and a second layer of the sensor plate board 40 comprises a shield. In some embodiments, the shield is comprised of a layer of copper that covers the entire surface of the second layer of the PCB. In some embodiments the layer of copper is covered with a non-conductive layer of soldermask. In some embodiments there are holes in the layer of soldermask. In some embodiments, the holes in the layer of soldermask comprise solder pads that are suitable for making solder bonds.

In some embodiments a four-layer PCB is configured as an interconnection board that has interconnections suitable for connecting circuitry components. In some embodiments the interconnection board is configured with four layers of interconnections that are suitable for interconnecting the sensing circuit 27, the controller 60, and the display circuit 25. In some embodiments one side of the PCB is configured for mounting components, and a second side of the PCB is configured with solder pads.

In some embodiments the sensor plates 5 are arranged on a first PCB. In some embodiments the interconnection circuitry is arranged on a second PCB. In some embodiments the first PCB is bonded to the second PCB.

In some embodiments there are solder pads on the sensor plate board 40 that are complementary with solder pads on an interconnection board. In some embodiments the sensor plate board 40 and the interconnection board may be stacked on top of one another and bonded to each other. In some embodiments the bonding agent that bonds the two PCBs together may be solder. In some embodiments solder paste may be used to bond two PCBs together. In some embodiments, they may be bonded together with solder and the process to bond them together may be standard SMT (surface mount technology) processes. The standard SMT process may include using a stencil to place solder paste in the desired locations. The SMT process may include placing one PCB on top of another. In some embodiments pins may be used to ensure proper alignment of the two PCBs. In some embodiments the final step of the SMT process may involve running the stacked PCBs through a reflow oven.

In some embodiments the sensor plates 5, shield, and circuitry are placed on a single PCB. In some embodiments a six-layer PCB is used. In some embodiments the bottom layer, which is the sixth layer, of the PCB is configured with sensor plates 5. The fifth layer may be an active shield. The top four layers may connect the balance of the circuitry.

In some embodiments the sensor plates 5, shield, and circuitry are placed on a single PCB. In some embodiments a four-layer PCB is used. First and second layers of the PCB are configured with interconnection circuitry. In some embodiments the bottom layer, which is the fourth layer, of the PCB is configured with sensor plates 5. The third layer may be an active shield.

The PCB can be made from a variety of suitable materials, such as, for example, FR-4, FR-406, or more advanced materials used in radio frequency circuits, such as Rogers 4003C. Rogers 4003C, and other radio-frequency-class PCB substrates, may offer improved performance across a broader temperature and humidity range.

As used herein, the term "module" can describe any given unit of functionality that can perform in accordance with one or more embodiments of the present invention. For example, a module might by implemented using any form of hardware or software, or a combination thereof, such as, for example, one or more processors, controllers 60, ASICs, PLAs, logical components, software routines, or other mechanisms.

Different processes of reading a capacitance and converting it to a digital value, also known as a capacitance-to-digital conversion, are well-described in the prior art. The many different methods are not described here, and the reader is referred to the prior art for details about different capacitance-to-digital converter methods. Some embodiments use a sigma-delta capacitance-to-digital converter, such as the one that is built into the Analog Devices AD7747 integrated circuit. Some embodiments use a charge-sharing method of capacitance-to-digital conversion.

In some embodiments the voltage regulator 26 may comprise the ADP150-2.65 from Analog Devices, or the NCP702 from ON Semiconductor, which provide very low noise. In some embodiments, the controller 60 may comprise the C8051F317 from Silicon Laboratories, or any of many other microcontrollers.

Detecting obscured features 3 can require a high degree of accuracy, and may require more accuracy than a capacitance-to-digital converter 21 may be able to provide, if the native capacitance-to-digital converter sensor readings are used alone. Native sensor readings are the raw values read from the capacitance-to-digital converter 21; they are the digital output of the capacitance-to-digital converter 21.

Some embodiments perform native reads multiple times, and combine the results of the multiple native reads, to create a reading. Some embodiments perform native reads multiple times, and combine the results of the multiple native reads, using a different configuration for two or more of the native reads to create a reading. Some embodiments perform native reads multiple times, and sum or average the results of the multiple native reads, to create a reading. In some embodiments this improves the signal-to-noise ratio. Each native read may involve reading one sensor plate 5. A native read could also involve reading a plurality of sensor plates 5, if multiple sensor plates 5 are multiplexed to the capacitance-to-digital converter 21. In some embodiments multiple native reads are combined to create a reading.

Summing or averaging multiple native reads may improve the signal-to-noise ratio, but may not reduce the effect of non-linearities in the capacitance-to-digital converter 21. The ideal capacitance-to-digital converter 21 is perfectly linear, which means that its native sensor readings increase in direct proportion to an increase in the capacitance being sensed. However, many capacitance-to-digital converters 21 may not be completely linear, such that a change in the input capacitance does not result in an exactly proportional increase in the native reading. These non-linearities may be small, but when a high degree of accuracy is desired it may be desirable to implement methods that reduce the effects of the non-linearities.

In some embodiments, the ill effects of the non-linearities may be mitigated by summing multiple native reads, using a slightly different configuration for each of the native reads. Some embodiments perform native reads using two or more different configurations.

For example, the bias current is one parameter that can be altered to create different configurations. The bias current could be set to normal, or normal+20%, normal+35%, or normal+50%. Different bias currents produce different native sensor readings, even if all other factors remain constant. Since each native reading has a different value, presumably each native reading may be subject to different non-linearities. Presumably summing or averaging sensor readings that are subject to different non-linearities may cause the non-linearities to partially cancel each other out, instead of being summed, or multiplied.

In some embodiments there are two separate and independent capacitance-to-digital converters 21. In some embodiments each of them may have different non-linearities. Using both of the capacitance-to-digital converters 21, using a first converter for some of the reads and using the second converter for some of the reads, may mitigate the effect of any single non-linearity.

Some embodiments perform native reads on each of the sensor plates 5 using each of twelve different configurations.

After completing the sensor readings, in some embodiments, two different calibration algorithms may be performed: first an individual-plate calibration that adjusts for individual sensor plate 5 variations, and second a surface material calibration that adjusts the sensor readings so that they are tuned to the surface density/thickness. Other embodiments may only use one of the two calibration algorithms. Some embodiments may use other calibration algorithms. In some embodiments the calibration algorithms are performed by a calibration module.

In some embodiments, individual plate calibration is employed first. With individual plate calibration, each sensor plate 5 may have its own individual calibration value. In some embodiments, after the sensor readings are taken, an individual plate calibration value is added to, or subtracted from, each of the sensor readings. Other embodiments may use multiplication, division, or other mathematical functions to perform the individual plate calibration. In some embodiments, the individual plate calibration value is stored in non-volatile memory. Individual plate calibration compensates for individual sensor plate 5 irregularities, and is used to compensate for these irregularities. In some embodiments it is presumed that after performing individual plate calibration that the sensor readings will presumably have the same calibrated values, if the sensor plate sensor readings are taken while the obscured feature detector 1 is on the surface 2 that is similar to the surface 2 the obscured feature detector 1 was calibrated on. For example, if sensor readings are performed on ½" sheetrock 2, without any obscured features 3 present, and the individual calibration values were created for ½" sheetrock 2, then after performing individual plate calibration, it is presumed that all the sensor readings would be corrected to a common value. If sensor readings are performed on a thicker material (such as ⅝" sheetrock 2), a thinner material (such as ⅜" sheetrock 2), or a different material (such as ¾" plywood) then there may be some error in the values. Surface material calibration may help correct this error.

In some embodiments surface material calibration may be used.

In some embodiments, after calibrating the sensor plate sensor readings the obscured feature detector 1 decides if an obscured feature 3 is present. In some embodiments the lowest sensor plate reading is subtracted from the highest sensor plate reading. If the difference is greater than a threshold value then a determination is made that an obscured feature 3 is present.

If it is determined that no obscured features 3 are present, then all of the indicators 6 may be deactivated. If an obscured feature 3 is present then the obscured feature detector 1 begins the process of determining the position(s) and width(s) of the obscured feature(s) 3.

In some embodiments pattern matching may be employed to determine which LEDs to activate. In some embodiments a pattern matching module is used to determine the locations of obscured features 3. The pattern matching module compares the calibrated and scaled sensor readings from the sensor plates 5 to several predetermined patterns. The pattern matching module determines which predetermined pattern best matches the sensor readings. Then the set of indicators 6 that corresponds to the best matching pattern is activated. Additional details about pattern matching are discussed in the prior art, such as in U.S. Pat. No. 8,884,633. Those details will not be repeated here; instead the reader is encouraged to refer to them directly.

In some embodiments the obscured feature detector 1 comprises a single capacitance-to-digital converter 21. In some embodiments the sensor plates 5 may be individually connected to the capacitance-to-digital converter 21. In some embodiments the sensor plates 5 may be individually connected to the capacitance-to-digital converter 21 via the multiplexer 18. In some embodiments more than one sensor plate 5 may be connected to the capacitance-to-digital converter 21 at a time. In some embodiments multiple adjacent sensor plates 5 may be electrically connected to the capacitance-to-digital converter 21. In some embodiments multiple non-adjacent sensor plates 5 may be connected to the capacitance-to-digital converter 21. The use of a multiplexer 18 to connect sensor plates 5 to a single capacitance-to-digital converter 21 may improve sensor plate 5 to sensor plate 5 consistency of the sensor readings, because the sensor readings from each of the sensor plates 5 may be equally affected by variations to the capacitance-to-digital converter 21. Factors that may affect the sensor readings from the capacitance-to-digital converter 21 may include, but are not limited to, process variations, temperature variations, voltage variations, electrical noise, aging, and others.

In some embodiments, the sensor plate traces 35 are routed such that each of the sensor plate traces 35 has substantially equal capacitance, resistance, and inductance. In some embodiments it is desirable for each of the sensor plate traces 35 to have the same electrical properties, so that each of the sensor plates 5 will respond equivalently to the same detected object(s).

In some embodiments each of the sensor plate traces 35 from the capacitance-to-digital converter 21 to each of the sensor plates 5 has substantially the same length. In some embodiments two or more of the sensor plate traces 35 from the capacitance-to-digital converter 21 to the sensor plates 5 have substantially the same length. In some embodiments sensor plate traces 35 with substantially the same length may have more equivalent capacitances, inductances, and resistances. Equal length sensor plate traces 35 may offer enhanced performance because they may improve the uniformity of the sensor readings, such that the sensor plates 5 respond more equivalently to the same detected objects, and may provide more immunity from environmental conditions, such as temperature and humidity.

In some embodiments each of the sensor plate traces 35, which comprises electrically conductive paths, has substantially the same width. In some embodiments, both the width and the length of each of the sensor plate traces 35 are substantially equivalent. In some embodiments the sensor plate traces 35 will have more than one segment. For example, a first segment of the traces may route the sensor plate traces 35 from a capacitance-to-digital converter 21 to a via. The via may take the sensor plate trace 35 to a different layer of the PCB, where there may be a second segment of the sensor plate trace 35. In some embodiments all of the sensor plate traces 35 will have the same length and width, in each segment, as the other traces in that segment. In some embodiments two or more of the sensor plate traces 35 will have the same width throughout a first segment. In some embodiments two or more of the sensor plate traces 35 will have the same width throughout a second segment. In some embodiments two or more of the sensor plate traces 35 will have the same length throughout a first segment. In some embodiments two or more of the sensor plate traces 35 will have the same length throughout a second segment.

In some embodiments the sensor plate traces 35 comprise multiple segments. In some embodiments a segment of a sensor plate trace 35 may be the wire bonds that are within the package of an integrated circuit that route the signals from the piece of silicon to the pins of the integrated circuit package. In some embodiments a segment of a sensor plate trace 35 may comprise a layer of copper on a first layer of a PCB. In some embodiments a segment of a sensor plate trace 35 may comprise a layer of copper on a second layer of a PCB.

In some embodiments the capacitance-to-digital converter 21 will read the sum of the capacitance on the sensor plates 5 and the capacitance on the sensor plate traces 35. In some embodiments, only detecting the sensor readings on the sensor plates 5, and not detecting the sensor plate traces 35, may be preferable. However, because the sensor plates 5 and sensor plate traces 35 are electrically coupled, a means of ensuring stable and uniform capacitance on the sensor plate traces 35 may be desired. For example, it may be desirable to configure the sensor plate traces 35 so that their capacitance is uniform and stable. Consequently, it may be preferred for the sensor plate traces 35 to be configured so that the sensor plate traces 35 do not change. In some embodiments it may be preferred that the sensor plate traces 35 do not change relative to each other, such that any change in the capacitance on one sensor plate trace 35 is reflected in each of the sensor plate traces 35.

In some embodiments it may be advantageous to shield the sensor plate traces 35. Sensor plate trace shielding may protect the sensor plate traces 35 from external electromagnetic fields. In some embodiments shielding the sensor plate traces 35 may also advantageously provide a more consistent environment for the sensor plate traces 35 by helping to ensure that each of the sensor plate traces 35 has an environment that is similar to each of the other sensor plate traces 35.

In some embodiments each of the sensor plate traces 35 from the capacitance-to-digital converter 21 to each of the sensor plates 5 has substantially the same surroundings. In some embodiments the sensor plate traces 35 are routed sufficiently far apart so that capacitive and inductive coupling between the sensor plate traces 35 is minimized, and may improve consistency because each of the sensor plate traces 35 may have surroundings that are more similar to the other sensor plate traces 35. In some embodiments each of the sensor plate traces 35 is shielded on one or both sides with an active shield trace.

In some embodiments a user may be electrically coupled to the sensing circuit 27. In some embodiments the quality of the sensor readings is increased when an electrically conductive point of the sensing circuit 27 is coupled to the user. Electrically coupling the user to the sensing circuit 27 may provide a stationary voltage level for the sensing circuit 27 and may result in higher quality sensor readings that have higher sensitivity. For example, a prior art obscured feature detector that drives the sensor plates 5 with a 3.0V may in reality only drive the sensor plates 5 with a 3.0V signal relative to ground. However, if the ground is floating, then driving the sensor plates 5 with 3.0V could result in a 1.5V signal on the sensor plates 5, and a −1.5V signal on the ground. In some embodiments the quality of the sensor readings is not increased when an electrically conductive point of the sensing circuit 27 is coupled to the user.

In some embodiments electrically coupling the user to the sensing circuit 27 may result in higher absolute voltage swings on the sensor plates 5, which may be due in part to the sensing circuit 27 being held at a stable level. In some embodiments electrically coupling the user to the sensing circuit 27 may also result in sensor readings that are more consistent.

In some embodiments the user is electrically coupled to the ground of the sensing circuit 27, as shown in FIG. 4. In some embodiments the user is electrically coupled to the voltage source of the sensing circuit 27. In some embodiments the user is electrically coupled to a different electrically conductive point of sensing circuit 27.

In some embodiments the hand of the user may be electrically coupled to the sensing circuit 27 by making direct contact with the sensing circuit 27. In some embodiments an electrically conductive material, such as a wire, may electrically couple the hand of the user to the sensing circuit 27. In some embodiments the button, which the user would need to touch to activate the obscured feature detector 1, may comprise an electrically conductive material which may be electrically coupled to the sensing circuit 27. In some embodiments the button may comprise aluminum or another electrically conductive material such as tin-plated steel. In some embodiments an aluminum button may be anodized, which may provide pleasing cosmetics.

In some embodiments the housing 19 (see FIG. 2) of the obscured feature detector 1 may comprise an electrically conductive material, such as an electrically conductive plastic. In some embodiments only a portion of the housing 19 may comprise electrically conductive plastic. The electrically conductive housing, or a portion of the electrically conductive housing may be coupled to an electrically conductive point in the sensing circuit 27, thereby coupling the user to the sensing circuit 27.

In some embodiments mixing carbon black with the plastic resin may provide electrically conductive properties. Many thermoplastics, including polypropylene and polyethylene, become electrically conductive when a carbon black is mixed into the plastic resin. In some embodiments the conductivity increases as the concentration of carbon black is increased, advantageously making it possible to control the conductivity of the plastic. In some embodiments a plastic with a conductivity that is less than about 25,000 ohms-cm provides sufficiently high conductivity to effectively couple the user to the sensing circuit 27. In some embodiments a higher degree of conductivity may be desired. In some embodiments a lower degree of conductivity may be desired. In some embodiments it is advantageous for the user to be coupled to the sensing circuit by a path with less than about fifty mega-ohms.

In some prior art obscured feature detectors, a change in the position of the hand of the user can cause a change in the sensor readings. This may occur in some prior art obscured feature detectors because the hand may form a portion of the path between the sensor plates 5 and ground. As a result, a change in hand position can cause a change in the sensor readings of the sensor plates 5. Disadvantageously, this may reduce the accuracy of the sensor readings.

If it were possible for the size and position of the hand of the user to be constant, it may be possible to do a calibration adjustment to mathematically remove the effect of the hand of the user from the raw sensor readings. However, in practice this may not be feasible. In practice the size, shape, and position of hands of different users may vary too much to make a calibration adjustment practically possible.

To improve performance in light of the aforementioned issues, in some embodiments a conductive hand guard may be positioned between the hand of the user and the sensor plates 5. In some embodiments the hand guard may be grounded to the sensing circuit 27, as illustrated in FIG. 4.

Figure 5:
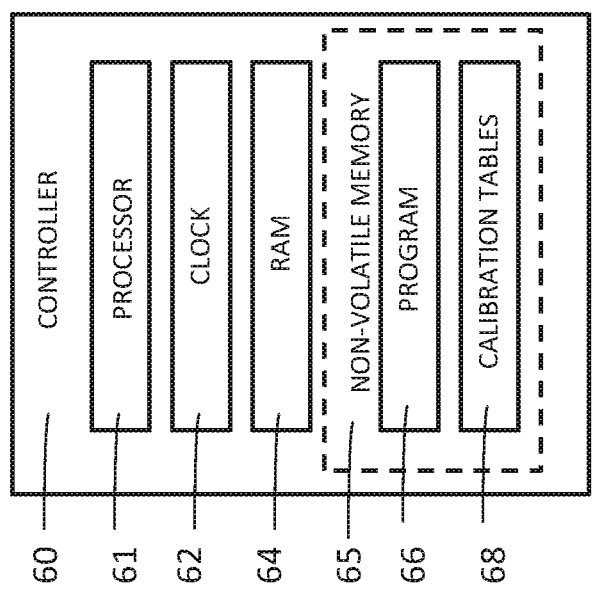
FIG. 5 is a diagram of a controller of an obscured feature detector, according to one embodiment.

FIG. 5 is a diagram of the controller 60, according to one embodiment. The controller 60 includes a processor 61, a clock 62, random access memory (RAM) 64, a non-volatile memory 65, and/or another computer-readable medium. The non-volatile memory 65 may include a program 66 (e.g., in the form of program code or computer-executable instructions for performing operations) and calibration tables 68. In operation, the controller 60 may receive the program 66 and may synchronize the functions of the capacitance-to-digital converter 21 and the display circuit 25 (see FIG. 4). The non-volatile memory 65 receives and stores the program 66 as well as look-up tables (LUT) and calibration tables 68. The program 66 can include a number of suitable algorithms, such as, for example, an initialization algorithm, a calibration algorithm, a pattern-matching algorithm, a multiplexing algorithm, a display management algorithm, an active sensor activation algorithm, and a non-active sensor management algorithm.

FIG. 6 is a cross-sectional view of an obscured feature detector, according to one embodiment, including a housing, with light pipes and a button, and a printed circuit board. In some embodiments, as shown in FIG. 6, a housing 19 comprises an upper housing, an on-off switch 24, a handle 14, a plurality of light pipes 8, and a power supply compartment. In some embodiments a conforming core may be configured to flexibly couple the housing 19 to a sensor plate board 40. In some embodiments the sensor plate board 40 is a multi-layered printed circuit board with a top layer 44, a second layer 43, a third layer 42, and a bottom layer 41. In some embodiments the sensor plate board 40 is a multi-layered printed circuit board that couples a capacitance-to-digital converter 21, a display circuit 25, and a controller 60, as described above with reference to FIG. 4. In some embodiments, the housing 19 comprises plastic. In some embodiments, the housing 19 comprises ABS plastic. In some embodiments a conductive hand guard 56 shields the user's hand from the sensor plate board 40. In some embodiments the hand guard 56 is connected to the ground of a sensing circuit.

In some embodiments, the handle 14 comprises a gripping surface. In some embodiments a portion of the gripping surface comprises an elastomer that makes the handle 14 easier to grip. The handle 14 is preferably positioned so that the user's hand does not obscure a view of the indicators 6 when grasping the handle 14. In some embodiments, the power supply compartment comprises a cavity for holding a suitable power supply, such as batteries, and a battery cover for accessing the compartment.

In some embodiments the hand guard 56 may be configured so that there are no significant straight-line paths between the sensor plates and the user's hand. In some embodiments the housing 19 may be composed of an electrically conductive material which may comprise the hand guard 56. In some embodiments the conductive layer of material of the hand guard 56 may be a layer of conductive plastic. In some embodiments the conductive layer of material of the hand guard 56 may be a layer of a different conductive material, such as a conductive paint. In some embodiments the conductive layer of material of the hand guard 56 may be a sheet of metal that is hidden within the housing 19. In some embodiments the hand guard 56 may comprise tin-plated steel, which may provide for quick, easy and reliable solder joints. In some embodiments an entire layer of a PCB may comprise the hand guard 56. In some embodiments only a portion of a layer of a PCB may comprise the hand guard 56, because in some embodiments it may not be necessary to for the hand guard 56 to comprise an entire layer. For example a ring around the outside of a PCB may be an effective hand guard 56.

In some embodiments this hand guard 56 is configured to minimize an effect of a size and position of the hand. In some embodiments the hand guard 56 is positioned so that it is near the hand because in some embodiments it may be most effective when it is nearest to the hand. In some embodiments the hand guard 56 may be electrically coupled to the ground of a sensing circuit 27 (see FIG. 4). In some embodiments the hand guard 56 may be coupled to the voltage of the sensing circuit 27. In some embodiments a different electrically conductive point of the sensing circuit 27 may be electrically coupled to the hand guard 56. In some embodiments an electrical wire comprises the electrical path between the hand guard 56 and the sensing circuit 27.

Figure 7:
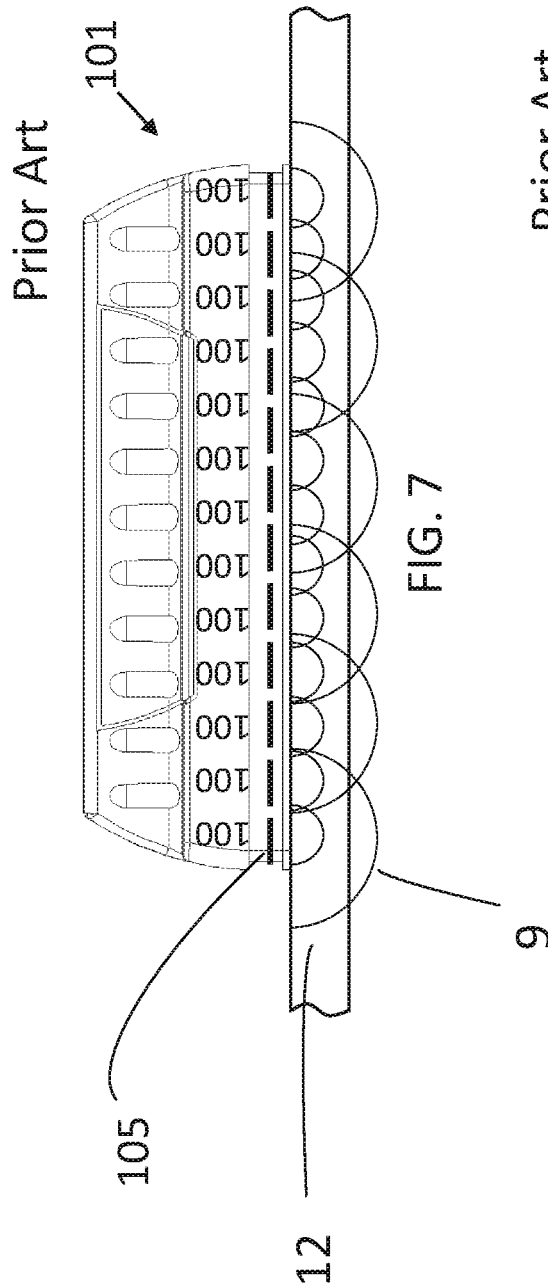
FIG. 7 is a prior art obscured feature detector placed on a comparatively thinner surface.
Figure 8:
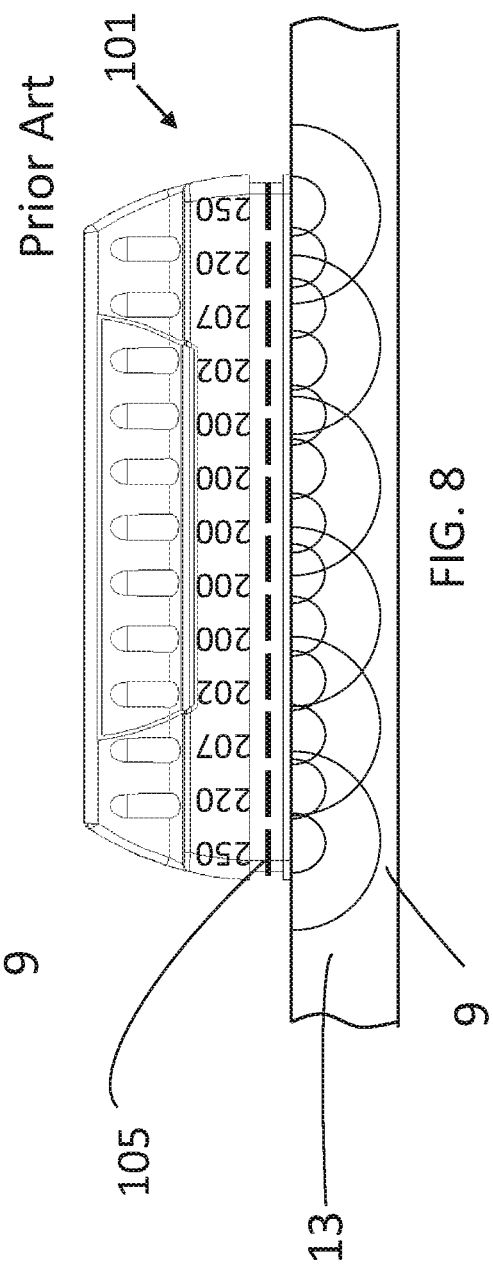
FIG. 8 is a prior art obscured feature detector placed on a comparatively thicker surface.
Figure 9:
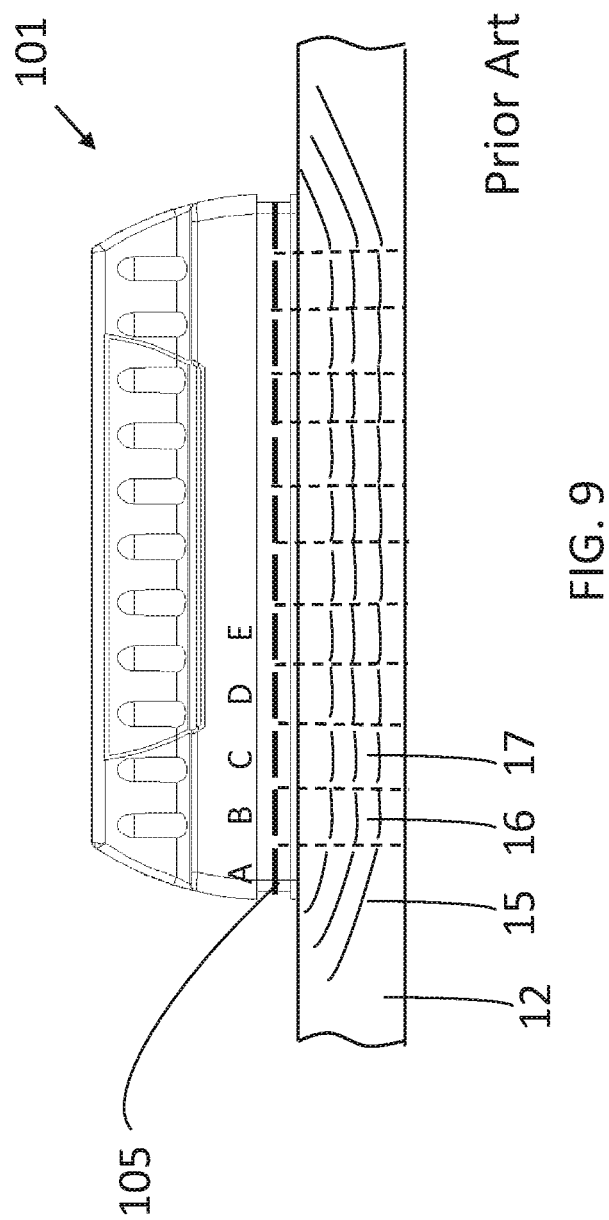
FIG. 9 shows a side view of a prior art obscured feature detector, illustrating primary sensing field zones for several sensor plates.

In prior art obscured feature detectors a set of identical sensor plates 105 are typically arranged in a linear fashion, such as is shown in FIGS. 7, 8, 9, and 10. FIG. 7 is a prior art obscured feature detector 101 placed on a comparatively thinner surface 12. FIG. 8 is the prior art obscured feature detector 101 placed on a comparatively thicker surface 13. FIG. 9 shows a side view of the prior art obscured feature detector 101, illustrating primary sensing field zones 15, 16, 17 for several sensor plates 105, including sensor plates A, B, C, D, E. FIG. 10 shows an elevation view of a bottom surface of the prior art obscured feature detector 101, illustrating the primary sensing field zones 15, 16, 17 for sensor plates A, B, C, D, E.

Referring generally and collectively to FIGS. 7-14, each of the sensor plates 105 performs a sensor reading of the surface 2. The sensor readings are then compared. The sensor plates 105 that have the highest sensor readings are interpreted to be the locations of obscured features. However, as shown in FIG. 7 and FIG. 8, the sensor plates 105 that are near the ends of the group may not respond to obscured features in the same manner as the sensor plates 105 that are near the center. This issue may be particularly evident when the prior art obscured feature detector 101 is moved from the thinner, or less dense, surface 12, to an thicker, or more dense, surface 13.

FIG. 7 shows representative sensor readings of the prior art obscured feature detector 101 that is placed on the relatively thinner surface 12. The relatively thinner surface 12 could be 0.375-inch-thick sheetrock. FIG. 8 shows representative sensor readings of the prior art obscured feature detector 101 that is placed on a relatively thicker surface 13. The relatively thicker surface 13 could be 0.625-inch-thick sheetrock.

In FIG. 7, the prior art obscured feature detector 101 is placed on the relatively thinner surface 12. Each of the sensor plates 105 may have a calibration adjustment so that each has a calibrated reading of, for example, 100. If this same prior art obscured feature detector 101 is then moved to another surface 13 that is thicker, or to a surface that has a higher dielectric constant, the sensor readings would change. An image of the same prior art obscured feature detector 101 on the thicker surface 13 is shown in FIG. 8. Ideally each of the sensor plates 105 on the thicker surface 13 would have similar sensor readings to each other, because they are all on the same thicker surface 13, with no obscured features present. However, it may be observed that the sensor readings of the sensor plates 105 near the ends may see a larger reading increase than the sensor plates 105 near the center. In FIG. 8, it may be seen that the sensor plates 105 near the center have sensor readings of 200, but the sensor plates 105 at the ends have sensor readings of 250.

In the prior art obscured feature detector 101 of FIG. 8, and other prior art obscured feature detectors, the sensor plates 105 that are at the ends are alone in creating electric fields 9 that extend beyond the edges of the group of sensor plates 105. As a result, the sensor plates 105 near the end may respond with a disproportionately higher reading when placed on a thicker surface 13. Disadvantageously, the controller 60 may have difficulty determining if the elevated sensor readings are due to the presence of an obscured feature, or due to the prior art obscured feature detector 101 being placed on the thicker surface 13. The disclosed embodiments may address these and other challenges.

FIG. 9 illustrates the field lines for the prior art obscured feature detector 101 of FIGS. 7 and 8. FIG. 9 shows a group of sensor plates 105 and also shows a two-dimensional representation of the field lines for each of the sensor plates 105. The field lines are shown for illustrative purposes and are a representation of the actual sensing field. The field lines drawn are equipotential electric field lines. However, this drawing does not limit the scope of the disclosure to this type of field alone. Vector electric field lines or magnetic field lines could have been illustrated in the drawing and are within the scope of the disclosure. The sensing field may be an electric field, or it may be a magnetic field, or it may be an electromagnetic field, which is a combination of an electric field and a magnetic field.

In FIG. 9 there are thirteen sensor plates 105. All of the sensor plates 105 may be driven with the same signal simultaneously, while one sensor plate 105 at a time is sensed. Because the sensor plates 105 are driven simultaneously, with the same signal, the sensing field is defined by the field created by the group of sensor plates 105, as illustrated in FIG. 9. An active shield plane is not illustrated in the figure, but an active shield may contribute to the sensing field in some embodiments. Five of the sensor plates 105 are labeled A, B, C, D, E. The field lines emanating from sensor plate E are primarily parallel to sensor plate E. However, the field lines emanating from sensor plate A are not very parallel to sensor plate A. Because the field lines do not have similar direction and strength at each point within the primary sensing field zone the sensor plates A and E do not have similar sensing fields within their primary sensing field zones.

In contrast, sensor plate D and sensor plate E have similar primary sensing field zones because the volume of the sensing field where they are able to sense effectively and the sensing field within that primary sensing field zone are similar. The sensing fields within a primary sensing field zone are similar if the direction of the sensing field and strength of the sensing field are similar at each point within the primary sensing field zone.

FIG. 10 illustrates the same concept from a different angle or perspective. In FIG. 10 the five sensor plates 105 are again labeled A, B, C, D, E. The approximate primary sensing field zones for each of the sensor plates 105 are highlighted. On the two-dimensional drawing of FIG. 10, the primary sensing field zone 15 for sensor plate A is indicated by the drawing of the sensing field lines for sensor plate A. On the two-dimensional drawing of FIG. 10, the primary sensing field zone 16 for sensor plate B is indicated by the drawing of sensing field lines for sensor plate B. On the two-dimensional drawing of FIG. 10, the primary sensing field zone 17 for sensor plate C is indicated by the drawing of sensing field lines for sensor plate C.

FIGS. 9 and 10 illustrate the primary sensing field zone with a two-dimensional drawing. However, in reality a three-dimensional primary sensing field zone may exist. There may be a three-dimensional zone for each sensor plate 105 that comprises the primary sensing field zone for each given sensor plate 105. In contrast to the prior art embodiment of FIGS. 9 and 10, in some embodiments of the present disclosure the sensor plates 105 may have an equivalent primary sensing field zone. Each sensor plate 105 in a group that has an equivalent primary sensing field zone may have an equivalent response to change in surfaces. This disclosure illustrates some configurations wherein each sensor plate 105 in a group may have an equivalent primary sensing field zone. In some embodiments each sensor plate 105 with a similar primary sensing field zone may have a similar change in sensor readings in response to a change in the detected surface.

Figure 11:
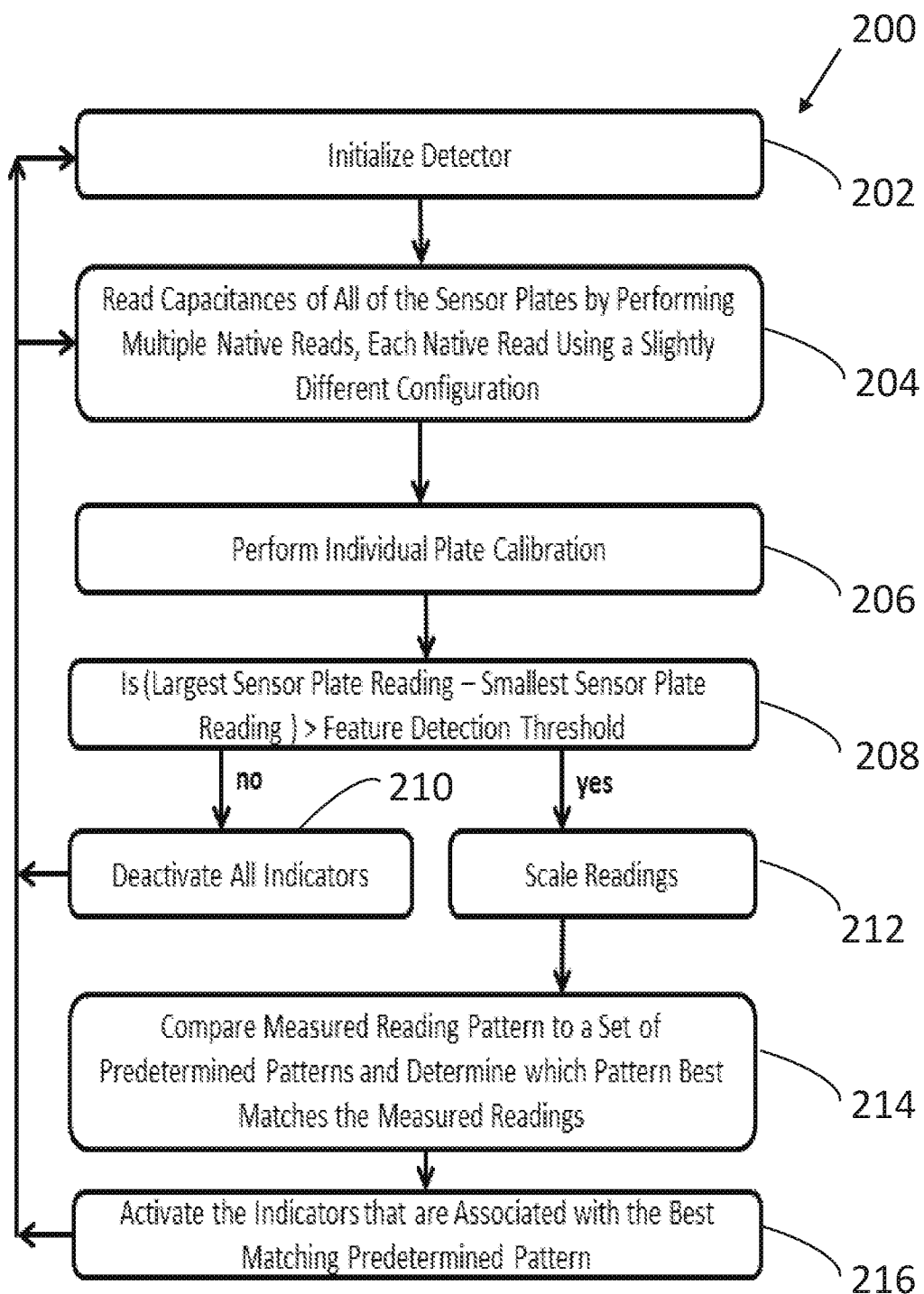
FIG. 11 is a flow diagram of a method of detecting an obscured feature behind a surface, according to one embodiment.

FIG. 11 is a flow diagram of a method 200 of detecting an obscured feature behind a surface, according to one embodiment. A first operation, as illustrated in the flow diagram in FIG. 11, may be to initialize a detector 202, which may involve running an initialization algorithm. The detector may be according to one of the embodiments described herein. After initialization, the sensor plates may be read 204. In some embodiments each of the sensor plates may be read multiple times, each time using a different configuration. The different configurations may comprise different drive currents, different voltage levels, different sensing thresholds, or other different configuration parameters. Each of these readings of the sensor plates may be referred to as native readings. In some embodiments multiple native readings may be added together to comprise a reading. In some embodiments there may be a separate reading for each sensor plate.

In some embodiments, each of these readings has a calibration 206 adjustment performed that is achieved by adding a predetermined calibration value to each reading. In some embodiments, after calibration, the readings for each of the sensor plates would be the same if the detector were to be placed on a uniform surface.

In some embodiments, the largest sensor plate reading is compared 208 to the lowest sensor plate reading. The difference is then compared 208 to a threshold value. In some embodiments, if the difference is less than a predetermined threshold value, then all of the indicators may be turned off 210, to indicate that no stud is present. If the difference is larger than a predetermined threshold value, then a determination may be made as to which indicators to activate. In certain embodiments, the readings may be scaled 212 to a predetermined range, which may involve setting the lowest value to a number such as 0, and scaling the largest reading to a value such as 100. Then all of the intermediate values would be scaled proportionately. The scaled readings may then be compared 214 to predetermined patterns which are scaled in a similar fashion.

In some embodiments there may be a set of predetermined patterns. The set of predetermined patterns may correspond to different combinations of hidden features that the detector may encounter. For example, the set of predetermined patterns may correspond to different positions for a single stud. In some embodiments, the set of predetermined patterns may include positional combinations of two studs. A pattern matching algorithm may be employed to determine which predetermined pattern best matches the reading pattern. The detector may then activate 216 the indicators that correspond to the best matching predetermined pattern.

In other embodiments, after calibrating the sensor plate readings, a determination is made if an obscured feature is present. The lowest sensor plate reading may be subtracted from the highest sensor plate reading. If the difference is greater than a threshold value, then a determination is made that an obscured feature is present. If it is determined that no obscured features are present, then all of the indicators may be deactivated. If an obscured feature is present then a process may begin to determine position(s) and/or width(s) of the obscured feature(s). In some embodiments, all of the current sensor plate readings may be scaled such that the lowest reading is scaled to a predetermined value (such as 0) and the maximum reading is scaled to a second predetermined value (such as 100). All intermediate values may be scaled proportionately. Scaled readings may be easier to compare to a set of predetermined patterns.

Figure 12:
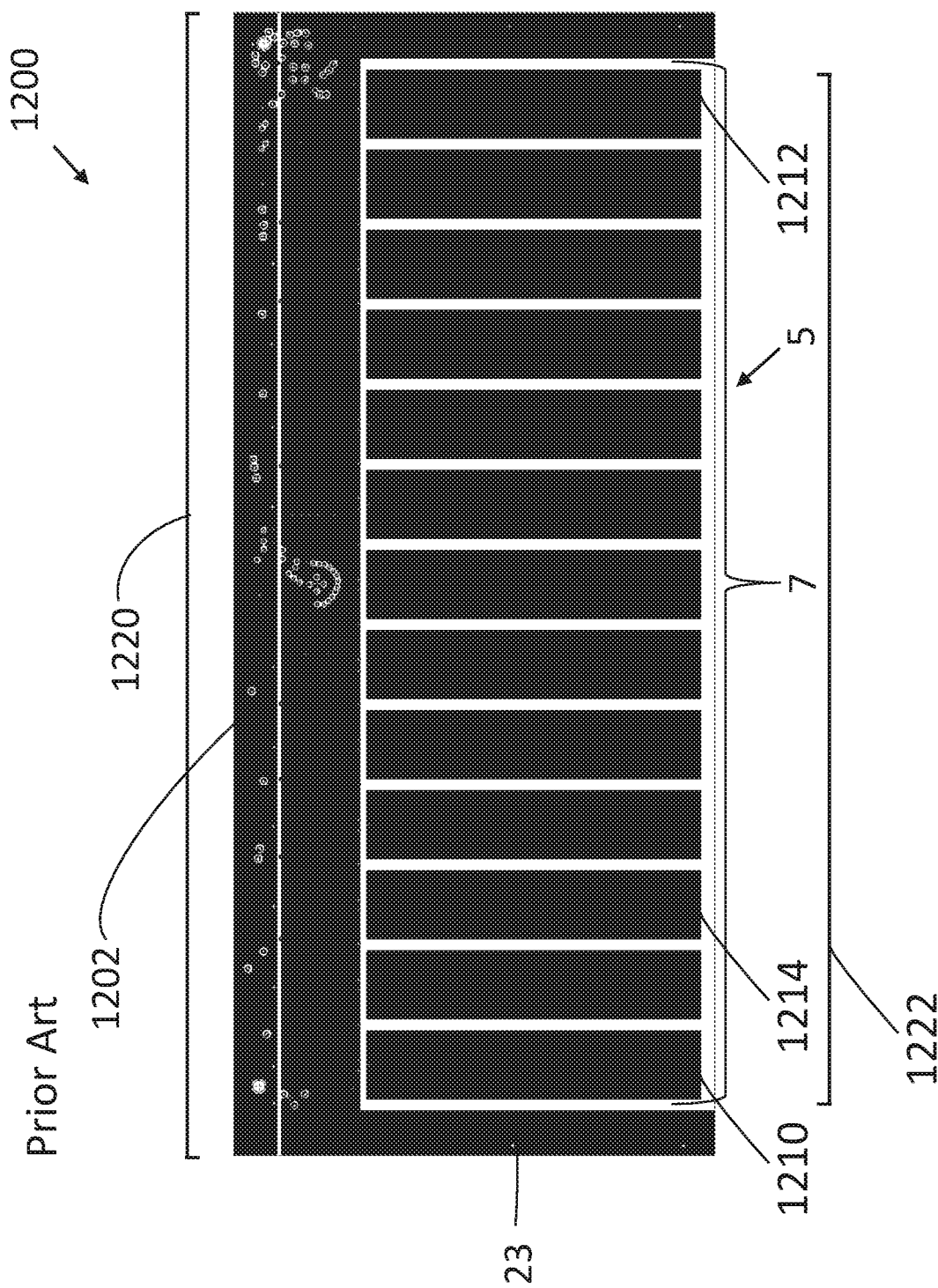
FIG. 12 is a prior art plate configuration for an obscured feature detector with a common plate.

FIG. 12 is a prior art obscured feature detector 1200 configuration having a typical plate configuration. As shown, the obscured feature detector 1200 may comprise three or more sensor plates 5, a common plate 1202, and an active shield plate 23.

The sensor plates 5, in the embodiment shown, are arranged linearly to form a sensor array 7. As shown, the sensor plates 5 may have the same geometry and be evenly spaced. Each sensor plate 5 has an internal border extending along at least a portion of an internal border of one or more other sensor plates, and an external border disposed at an outer perimeter of the sensor array 7. The linear sensor array includes two end sensor plates 1210, 1212 and at least one non-end sensor plate 1214.

Each sensor plate 5 is configured to take a sensor reading that varies based on a proximity of the sensor plate to one or more surrounding objects and on a material property of each of the one or more surrounding objects. To facilitate the sensor reading, an area of each sensor plate 5 may form a first end of a corresponding electric field.

The common plate 1202 may form a second end of the corresponding electric field of each sensor plate 1202. The common plate 1202 has a length 1220 extending along a length 1222 of the sensor array, such that the common plate 1202 extends along one external border of each of the sensor plates 5. As shown, the common plate extends beyond an entire linear dimension of the sensor array 7. Common plates of presently available plate configurations are at least 17 millimeters longer than the sensor array, whether due to housing size or shape, shielding configurations, or other reasons. The electric fields of the end sensor plates formed with such longer common plates are non-uniform in comparison to the electric fields formed by non-end sensor plates with such longer common plates.

Figure 13:
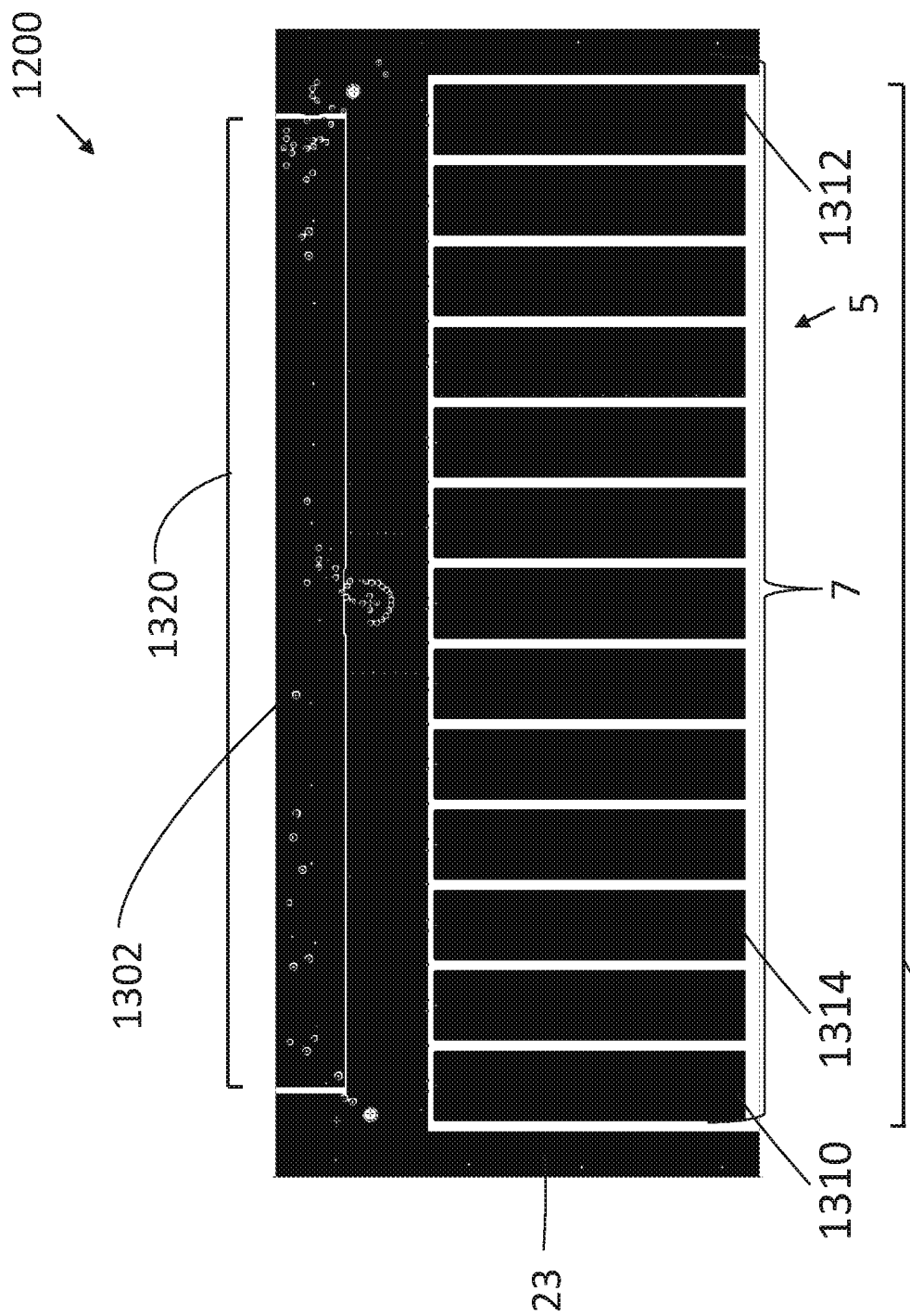
FIG. 13 is a plate configuration for an obscured feature detector with a shortened common plate.

FIG. 13 is an obscured feature detector 1300 having an improved plate configuration with a shortened common plate 1302. As shown, the obscured feature detector 1300 may comprise three or more sensor plates 5, a shortened common plate 1302, and an active shield plate 23.

The sensor plates 5 in the embodiment shown are arranged linearly to form a sensor array 7. As shown, the sensor plates 5 may have the same geometry and be evenly spaced. In other embodiments, the sensor plates 5 may vary in size and/or shape, and may be spaced differently based on the position of the sensor plate 5 in the sensor array 7. Each sensor plate 5 has an internal border extending along at least a portion of an internal border of one or more other sensor plates, and an external border disposed at an outer perimeter of the sensor array. The linear sensor array 7 includes two end sensor plates 1310, 1312 and at least one non-end sensor plate 1314.

Each sensor plate 5 is configured to take a sensor reading that varies based on a proximity of the sensor plate 5 to one or more surrounding objects and on a material property of each of the one or more surrounding objects. To facilitate the sensor reading, an area of each sensor plate 5 may form a first end of a corresponding electric field.

The shortened common plate 1302 may form a second end of the corresponding electric field of each sensor plate. The shortened common plate 1302 has a length 1320 extending along a length 1322 of the sensor array 7 such that the shortened common plate 1302 extends along the sensor array 7 and at least partially along one external border of each of the three or more sensor plates 5. In some embodiments, the shortened common plate may not extend along one or both of the end sensor plates. The length 1320 of the shortened common plate 1302 is less than the collective linear dimension of the sensor array 7 along which the shortened common plate 1302 extends. In the embodiment shown, the shortened common plate 1302 is centered along the sensor array 7. In some embodiments, the shortened common plate may be off-centered.

The active shield plate 23 separates the sensor plates 5 and the shortened common plate 1302. In the embodiment shown, the active shield plate 23 surrounds the shortened common plate 1302 along three sides. In other embodiments the active shield plate 23 may only run along the length 1320 of the shortened common plate 1302. However, having the active shield plate 23 surround the common plate may decrease the complexity of manufacturing.

In some embodiments, one sensor plate 5 may be sensed at a time. In some embodiments when one sensor plate 5 is sensed, all of the sensor plates 5, including the active shield plate 23, are driven with the same signal as the sensed sensor plate 5. The sensor array 7, plus the active shield plate 23, when driven together may push the field lines of the corresponding electric field deeper into the sensed surface than may be possible if just a single sensor plate 5 was driven. In some embodiments this allows field lines from a single sensor plate 5 to penetrate more deeply, and allows a single sensor plate 5 to sense more deeply, than may be possible if a single sensor plate 5 were driven alone.

Figure 14:
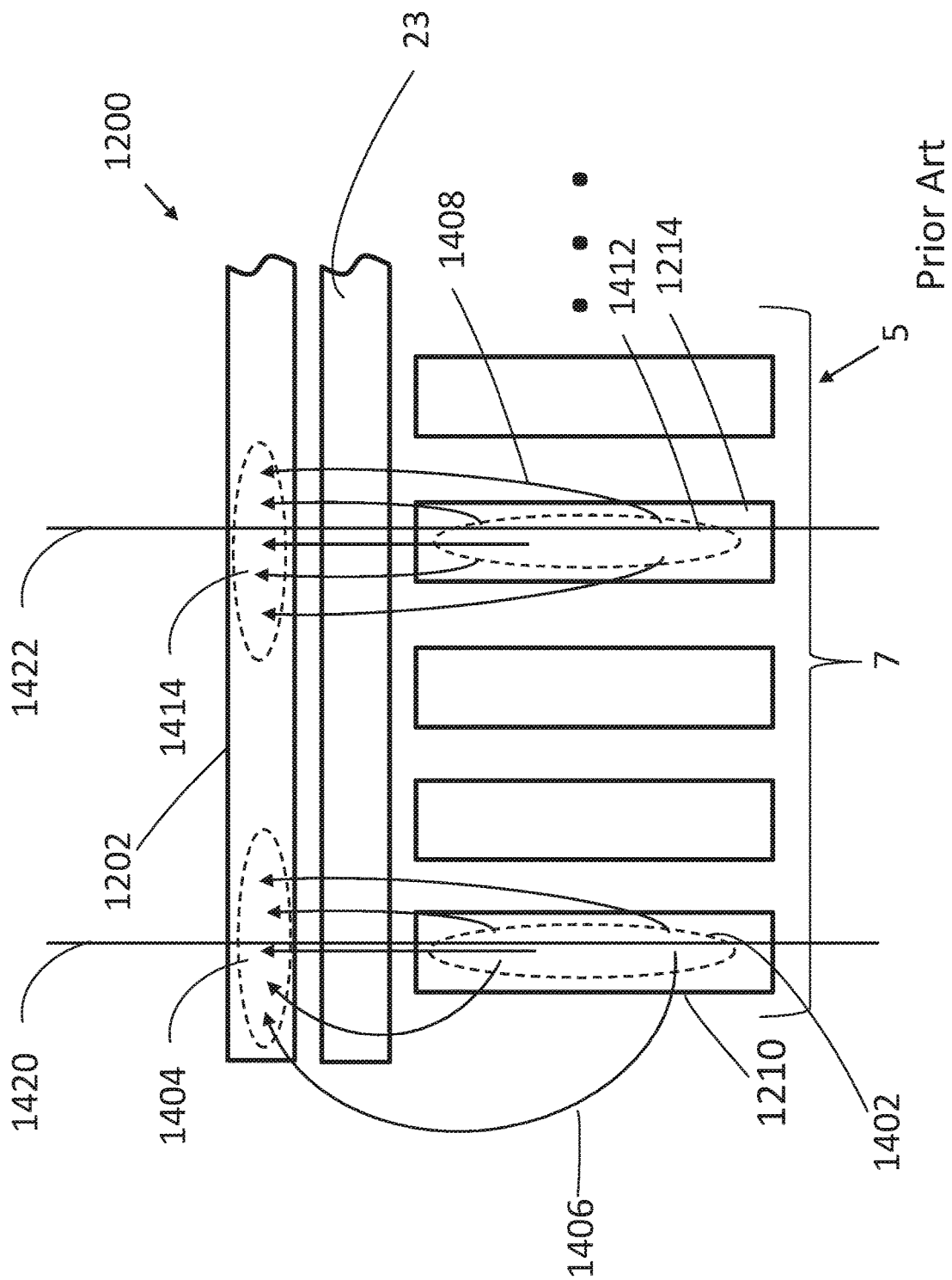
FIG. 14 illustrates the electric field lines for the prior art plate configuration of FIG. 12.

FIG. 14 illustrates the electric fields created by the prior art plate configuration 1200 of FIG. 12. Each sensor plate 5 is configured to provide a primary coupling area 1402, 1412 to form a first end of a corresponding electric field 1406, 1408. Further, the common plate 1202 is configured to provide a corresponding primary coupling area 1404, 1414 to correspond to a sensor plate 5 and form a second end of the corresponding electric field 1406, 1408 of that sensor plate 5.

A primary coupling area 1402, 1412 is the area of a sensor plate 5 where an electric field 1406, 1408 primarily couples. In the illustrated prior art, a primary coupling area 1402 of an end sensor plate 1210 is on a line 1420 with a corresponding primary coupling area 1404 of the common plate 1202. Similarly, a primary coupling area 1404 of a non-end sensor plate 1214 is on a line 1422 with a corresponding primary coupling area 1414 of the common plate 1202. As shown, the line 1420 of the primary coupling area 1402 of the end sensor plate 1210 to the corresponding primary coupling area 1404 of the common plate 1202 is approximately parallel with the line 1422 of the primary coupling area 1404 of the non-end sensor plate 1214 to the corresponding primary coupling area 1414 of the common plate 1202.

As shown, the electric field 1406 formed from the end sensor plate 1210 in this configuration has a different geometry than the electric field 1408 formed from the non-end sensor plate 1214. The electric fields generated by surrounding sensing plates 5 affect each other sensing plate 5. The non-uniform electric field 1406 is a result of the end-sensor plate 1210 not having sensor plates 5 along both sides. The non-uniformity of the electric field 1406 may result in an inaccurate detection or a missed detection of obscured features. For example, the electric field 1406 generated by the end sensor plate 1210 may penetrate more broadly into a surface than the electric filed 1408 generated by the non-end sensor plate 1214. Because of the different sensing areas, the end sensor plate 1210 may falsely identify an obscured feature.

Figure 15:
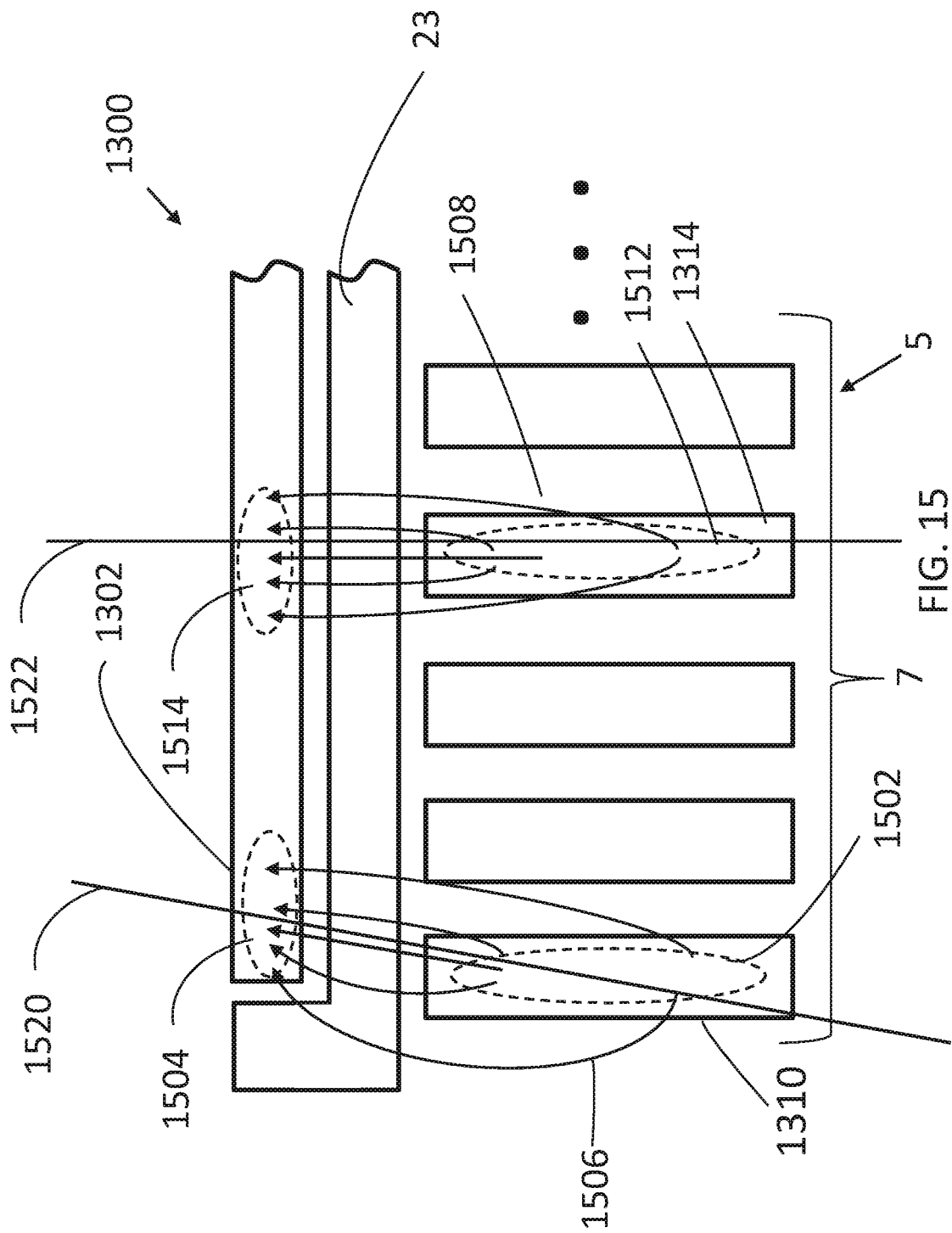
FIG. 15 illustrates the electric field lines for the plate configuration of FIG. 13.

FIG. 15 illustrates the electric fields 1506, 1508 created between an end sensor plate 1310 and a non-end sensor plate 1314 in the plate configuration of the obscured feature detector 1300 of FIG. 13. Primary coupling areas (e.g., 1502, 1512) may couple the sensor plates 5 to the common plate 1302. Each of the sensor plates 5 is configured to provide a primary coupling area (e.g., 1502, 1512) to form a first end of a corresponding electric field. The common plate 1302 is configured to provide corresponding primary coupling areas (e.g., 1504, 1514) that each correspond to a sensor plate 5 and forms a second end of the corresponding electric field of that sensor plate 5.

For example, as shown, the end sensor plate 1310 is configured to provide primary coupling area 1502 and the non-end sensor plate 1314 is configured to provide primary coupling area 1512. The common plate 1302 is configured to provide a corresponding primary coupling area 1504 that corresponds to the primary coupling area 1502 of the end sensor plate 1310 and a corresponding primary coupling area 1514 that corresponds to the primary coupling area 1512 of the non-end sensor plate 1314.

As illustrated, the electric fields 1506, 1508 couple the primary coupling areas 1502, 1512 of the sensor plates 5 to the corresponding primary coupling areas 1504, 1524 of the common plate 1302. The primary coupling area 1502 of the end sensor plate 1310 is on a first line 1520 with the corresponding primary coupling area 1504 of the common plate 1302. Further, the primary coupling area 1512 of the non-end sensor plate 1314 is on a second line 1522 with the corresponding primary coupling area 1514 of the common plate 1302.

To achieve similar electric fields, the first line 1520 and the second line 1522 between the coupling areas of the sensor plates 5 and the common plate 1302 are non-parallel. The electric fields generated by neighboring sensing plates 5 affect each other sensing plate 5. Because the end sensor plate 1310 only has one neighboring sensor plate 5, the electric field 1506 would naturally travel a greater distance than the electric field 1508 of the non-end sensor plate 1324. As shown in FIG. 14, the path of the greater distance may extend beyond the obscured feature detector. In contrast, as shown In FIG. 15, the shortened common plate 1302 pulls the electric field 1506 into near alignment with electric field 1508. This may be because the sizing and placement of the shortened common plate 1302 causes the electric field 1506 from the end sensor plate 1310 to have more similarity to the electric fields 1508 to the non-end sensor plate 1314, as compared prior art obscured feature detectors.

In some embodiments the electric field 1506 that corresponds to the end sensor plates 1310 have the same size, shape, direction, and/or geometry as the electric field 1508 that corresponds to non-end sensor plates 1314. In some embodiments the electric fields that corresponds to each of the sensor plates 5 have the same size, shape, direction, and/or geometry as each of the other sensor plates 5. In some embodiments, the electric fields that correspond to each of a group of sensor plates 5 has the same size, shape, direction, and/or geometry.

In some embodiments similar electric field size, shape, direction, and/or geometry results in more consistent readings, because each sensor plate 5 will respond more uniformly to a change to surface or to the object(s) being detected. Sensor plates 5 that each respond similarly may be able to better detect obscured features that are deeper in a wall, or obscured features that may be harder to detect. With similar electric fields the result may be an obscured feature detector that can be used on a variety of different surfaces and may perform equally well on each of the variety of different surfaces. The result may also be an obscured feature detector that can sense more deeply, or more accurately, or both.

In some embodiments an obscured feature detector may have a common plate that is less than the collective linear dimension of the three or more sensor plates. This configuration may result in forming electric fields that have a similar size, shape, and/or geometry. In some embodiments an obscured feature detector may have a common plate that is less than the collective linear dimension of the three or more sensor plates plus 16 millimeters. This configuration of a common plate less than a length of the sensor array plus 16 millimeters may result in electric fields that have a similar size, shape, direction, and/or geometry. In other words, in some embodiments there may be a length that is defined as an array-plus length. This array-plus length may be at most 16 millimeters longer than the collective length of the sensor array. In some embodiments this array-plus length may be at most one and a half times a sensor width longer than the collective length of the sensor array. In other words, the length of the common plate may measure longer than the array by at most one and a half times a width of a sensor plate (e.g., a width of an end sensor plate). An obscured feature detector that has a common plate that is less than the array-plus length may be called a shortened common plate. In some embodiments an obscured feature detector that has a shortened common plate may have electric fields that each have a more similar size, shape, direction, and/or geometry.

A result of the increased similarity of the electric fields may be that the obscured feature detector can sense more accurately and more deeply into and/or through a surface.

An obscured feature detector with a shortened common plate may have electric fields that each have a more similar size, shape, direction, and/or geometry, as compared to obscured feature detectors with a common plate described in the prior art. More uniformity in the size, or shape, or direction, or geometry of the electric fields associated with each sensor plate may provide more uniform readings for each of the sensor plates. Sensor plates that each have similar electric fields may each respond in a more uniform manner to different surface materials and thicknesses. For example, one embodiment of an obscured feature detector with a shortened common plate may be placed on a particular surface, such as a surface of 0.25 inch thick sheetrock. When placed on this surface each of the sensor plates may each have the same reading, such as a reading of 100 units, for example. In this example if the same obscured feature detector is placed on a different surface, such as 0.50 inch sheetrock each of the readings may change to a different value, but once again each of the sensor plate readings may be similar, such as a value of 200 units. When the readings from each of the sensor plates provide similar readings, independent of whatever surface the obscured feature detector is placed upon, any variation in sensor plate readings may be attributed to the presence of an obscured feature. Obscured feature detectors with shortened common plates may maintain a greater uniformity in the readings, across different surfaces, than prior art obscured feature detectors. Readings that are uniform, independent of the surface, may make it possible to sense more accurately and more deeply, identify feature width more accurately, and make it possible to sense two objects simultaneously more precisely. In some embodiments a shortened common plate may have the advantageous result of the sensing field for each sensor plate being positioned more precisely in the region near the sensor plate. As a result, the obscured feature detector may sense more accurately and more deeply.

In some presently available obscured feature detectors the common plate is less than 8.00 millimeters wide. In some embodiments of an improved obscured feature detector there may be improved performance if the common plate is more than 8.00 millimeters wide. Obscured feature detectors that have a common plate that is more than 8.00 millimeters wide may have may have electric fields that each have a more similar size, shape, direction, and/or geometry, as compared to obscured feature detectors with a common plate described in the prior art.

As shown in FIG. 15, an obscured feature detector 1300 may have a primary coupling area 1502 of an end sensor plate 1310 of the sensor array 7 on a first line 1520 with the corresponding primary coupling area 1504 of the one or more common plates. The obscured feature detector may also have a primary coupling area 1512 of a non-end sensor plate 1314 of the sensor array 7 on a second line 1522 with a corresponding primary coupling area 1514 of the one or more common plates. In some embodiments, the first line 1520 and the second line 1522 are non-parallel. This may result in electric fields that have a similar size, shape, direction, and geometry.

In other words, if origin and termination of the electric field corresponding to a non-end sensor plate 1314 is on a first line 1520, and, if the origin and termination of the electric field corresponding to an end sensor plate 1310 is on a second line 1522, and if the first line 1520 and the second line 1522 are non-parallel, then the electric fields 1506 corresponding to the end sensor plates 1310 may be more similar to the electric fields 1508 corresponding to non-end sensor plates 1314, than would be the case if the first and second lines 1520, 1522 were parallel. The result may be that each of the sensor plates 5 may have a more uniform response to changes in the surface or object being detected. As a result, the obscure feature detector 1300 may sense more accurately and more deeply.

For example, if the presence of an obscured feature causes one of the sensor plates 5 to have a particular reading when an object is placed in proximity to the sensor plate 5, it would be desirable for each of the sensor plates 5 to have the same reading when the obscured featured is placed in the same position relative to the sensor plate 5. The uniform response just described may make it possible to sense more independently of the surface material or thickness. The result may be that studs are sensed more accurately, independent of the surface material or thickness.

The plate configuration of the embodiment of an obscured feature detector 1300 of FIG. 15 causes the electric field 1506 formed from an end sensor plate 1310 and the electric field 1508 formed from a non-end sensor plate 1314 to have a similar size, shape, or orientation. This is in contrast with the electric fields shown in FIG. 14. The uniformity of the electric fields may increase the accuracy of an obscured feature detector. The increased accuracy may be a result of the electric fields of each sensing plate 5 taking a similar reading (e.g., a reading covering a similar depth and width).

Figure 16:
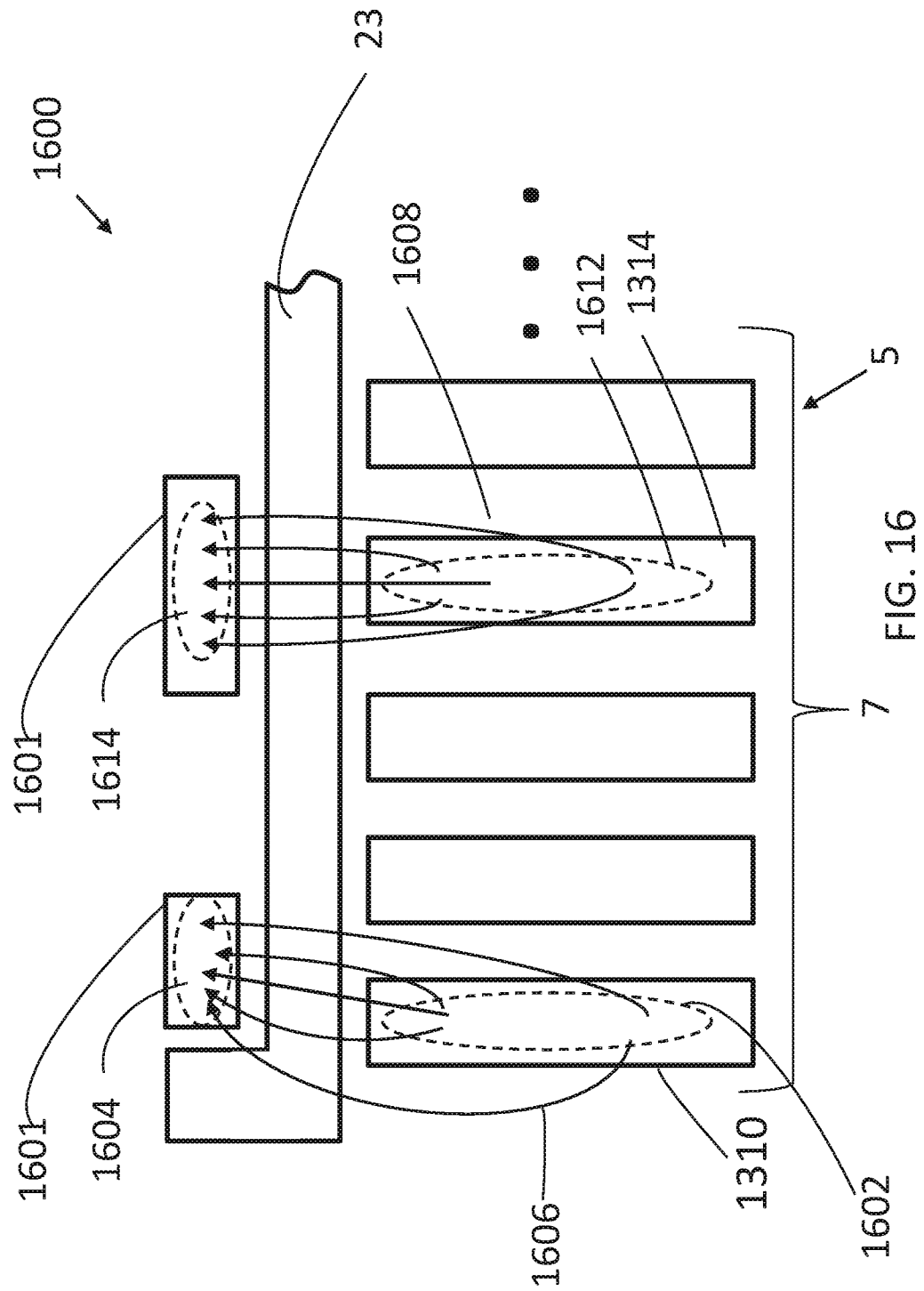
FIG. 16 illustrates the electric field lines for a sensor plate array with multiple common plates.

FIG. 16 illustrates the electric fields 1606, 1608 emitted from an end sensor plate 1310 and a non-end sensor plate 1314 for a plate configuration 1600 with multiple common plates 1601. As shown, the multiple common plates 1601 may be sized, configured, and aligned to cause the electric field 1606 formed from an end sensor plate 1310 to have a similar size, shape, and/or orientation to the electric field 1608 formed from a non-end sensor plate 1314. The multiple common plates 1601 may be arranged linearly to extend along the length of a sensor array 7.

Just as in FIG. 15, the primary coupling area 1602 of the end sensor plate 1310 of the sensor array 7 is on a first line with the corresponding primary coupling area 1604 of the multiple common plates 1601. Further, the primary coupling area 1612 of a non-end sensor plate 1314 of the sensor array is on a second line with the corresponding primary coupling area 1614 of the multiple common plates 1601. Due to the positioning of the multiple common plates 1601, the first line and the second line are non-parallel causing the electric field 1606 formed from the end sensor plate 1310 to have a similar geometry to the electric field 1608 formed from the non-end sensor plate 1314. The uniformity of the electric fields may increase the accuracy of an obscured feature detector.

Figure 17:
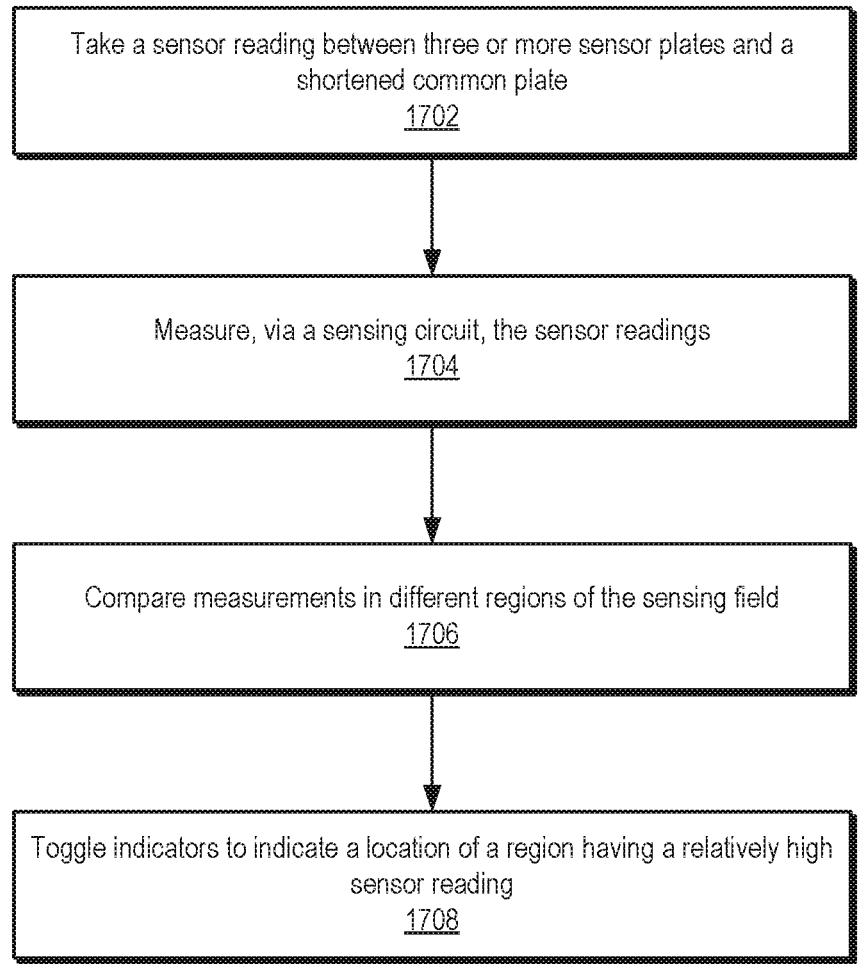
FIG. 17 is a flow chart illustrating a method of detecting an obscured feature behind a surface with a plate configuration with a shortened ground plane, according to one embodiment.

FIG. 17 is a flow chart illustrating a method 1700 of detecting an obscured feature behind a surface. The method includes taking 1702 a sensor reading between the three or more sensor plates and a shortened common plate of an obscured feature detector. The three or more sensor plates are arranged linearly in a sensor array. The sensor reading is of a region of a sensing field formed between the three or more sensor plates and a common plate of the obscured feature detector. The common plate is less than a dimension of the sensor array.

The method may further include measuring 1704, via a sensing circuit, the sensor readings of the three or more sensor plates, and comparing 1706 measurements of sensor readings in different regions of the sensing field. The measured sensor reading may be a capacitive reading or an electromagnetic reading. Further, the method may toggle 1708 indicators from a deactivated state to an activated state to indicate a location of a region of the sensing field having a relatively high sensor reading.

EXAMPLES

The following are some example embodiments within the scope of the disclosure. In order to avoid complexity in providing the disclosure, not all of the examples listed below are separately and explicitly disclosed as having been contemplated herein as combinable with all of the others of the examples listed below and other embodiments disclosed hereinabove. Unless one of ordinary skill in the art would understand that these examples listed below, and the above disclosed embodiments, are not combinable, it is contemplated within the scope of the disclosure that such examples and embodiments are combinable.

Example 1

An obscured feature detector may include three or more sensor plates arranged linearly to form a sensor array. Each sensor plate may be configured to take a sensor reading that varies based on a proximity of the sensor plate to one or more surrounding objects and on a material property of each of the one or more surrounding objects. Each sensor plate may form a first end of a corresponding electric field. The obscured feature detector may also include a common plate to form a second end of the corresponding electric field of each sensor plate. The common plate may have a length extending along the sensor array and along one side of each of the three or more sensor plates. The length of the common plate may be less than a collective linear dimension of the sensor array along which the common plate extends. The obscured feature detector may also include a sensing circuit coupled to the three or more sensor plates, the sensing circuit may be configured to measure the sensor readings of the three or more sensor plates. The obscured feature detector may include an indicator that may toggle between a deactivated state and an activated state to indicate a location of a region of relative high sensor reading.

Example 2

An obscured feature detector comprising may include three or more sensor plates forming a sensor array. Each sensor plate may capture a sensor reading that varies based on a proximity of the sensor plate to one or more surrounding objects and on a material property of each of the one or more surrounding objects. The three or more sensor plates may collectively create a sensing field. Each individual sensor plate of the three or more sensor plates may create a corresponding primary sensing field zone within the sensing field where the individual sensor plate contributes more strongly to the sensing field than any other of the three or more sensor plates. The three or more sensor plates may create primary sensing field zones that are geometrically similar. The obscured feature detector may include a common plate to receive the primary sensing field zones, the common plate having a length that extends along a length of the sensor array, the length of the common plate being less than the length of the sensor array. In some embodiments, the common plate may have a length less than 16 millimeters wider than the sensor array length. The obscured feature detector may include a sensing circuit coupled to the three or more sensor plates, the sensing circuit configured to measure sensor readings of the three or more sensor plates. The obscured feature detector may include an indicator to be toggled between a deactivated state and an activated state to indicate a location of a region of relative high sensor reading.

Example 3

An obscured feature detector may include three or more sensor plates arranged linearly to form a sensor array. Each sensor plate may take a sensor reading that varies based on a proximity of the sensor plate to one or more surrounding objects and on a material property of each of the one or more surrounding objects. Each of the sensor plates may provide a primary coupling area to form a first end of a corresponding electric field. The obscured feature detector may include one or more common plates that are configured to provide a corresponding primary coupling area to correspond to a sensor plate and form a second end of the corresponding electric field of that sensor plate. The primary coupling area of an end sensor plate of the sensor array is on a first line with the corresponding primary coupling area of the one or more common plates, and the primary coupling area of a non-end sensor plate of the sensor array is on a second line with the corresponding primary coupling area of the one or more common plates, wherein the first line and the second line are non-parallel. The obscured feature detector may include a sensing circuit coupled to the three or more sensor plates, the sensing circuit being configured to measure the sensor readings of the three or more sensor plates. The obscured feature detector may include an indicator to be toggled between a deactivated state and an activated state to indicate a location of a region of relative high sensor reading.

It will be obvious to those having skill in the art that many changes may be made to the details of the above-described embodiments without departing from the underlying principles of the invention. The scope of the present invention should, therefore, be determined only by the following claims.

The invention claimed is:

1. An obscured feature detector comprising:
three or more sensor plates arranged linearly to form a sensor array, each sensor plate configured to take a sensor reading that varies based on a proximity of the sensor plate to one or more surrounding objects and on a material property of each of the one or more surrounding objects, each of the sensor plates configured to provide a primary coupling area to form a first end of a corresponding electric field;
one or more common plates that are configured to provide a corresponding primary coupling area to correspond to a sensor plate and form a second end of the corresponding electric field of that sensor plate,
wherein a center of the primary coupling area of an end sensor plate of the sensor array is on a first line with a center of the corresponding primary coupling area of the one or more common plates,
wherein a center of the primary coupling area of a non-end sensor plate of the sensor array is on a second line with a center of the corresponding primary coupling area of the one or more common plates,
wherein the first line and the second line are non-parallel, and
wherein a response of the end sensor plate is similar to a response of a middle sensor plate;
a sensing circuit coupled to the three or more sensor plates, the sensing circuit being configured to measure the sensor readings of the three or more sensor plates; and
an indicator to be toggled between a deactivated state and an activated state to indicate a location of a region of relative high sensor reading.

2. The obscured feature detector of claim 1, wherein each of the sensor plates form an electric field with a single common plate of the one or more common plates, wherein a collective length of the one or more common plates is less than a length of the sensor array.

3. The obscured feature detector of claim 1, wherein the three or more sensor plates are each driven with a same signal simultaneously.

4. The obscured feature detector of claim 1, wherein the one or more common plates are configured such that the corresponding electric field formed by the end sensor plate is responsive similar to the corresponding electric field formed by a middle sensor plate.

5. The obscured feature detector of claim 1, wherein a common plate of the one or more common plates is more than 8.0 millimeters wide.

6. An obscured feature detector comprising:
three or more sensor plates arranged linearly to form a sensor array, each sensor plate configured to take a sensor reading that varies based on a proximity of the sensor plate to one or more surrounding objects and on a material property of each of the one or more surrounding objects, each sensor plate forming a first end of a corresponding electric field;
a common plate to form a second end of the corresponding electric field of each sensor plate, the common plate having a length extending along the sensor array and along one side of each of the three or more sensor plates, the length of the common plate being at most 16 millimeters longer than a collective length of the sensor array,
wherein a response of each of the three or more sensor plates is similar to a response of every other sensor plate of the three or more sensor plates;
a sensing circuit coupled to the three or more sensor plates, the sensing circuit being configured to measure the sensor readings of the three or more sensor plates, and detect a non-metallic object; and
an indicator to be toggled between a deactivated state and an activated state to indicate a location of a region of relative high sensor reading.

7. The obscured feature detector of claim 6, wherein the three or more sensor plates are each driven with a same signal simultaneously.

8. The obscured feature detector of claim 6, wherein the three or more sensor plates are each driven with a same signal simultaneously and wherein the sensing circuit measures the sensor reading of one of the three or more sensor plates.

9. The obscured feature detector of claim 6, further comprising an active shield, wherein the three or more sensor plates and the active shield are each driven with a same signal simultaneously.

10. The obscured feature detector of claim 6, wherein the three or more sensor plates and an active shield are each driven with a same signal simultaneously and wherein the sensing circuit measures the sensor reading of only one of the sensor plates.

11. The obscured feature detector of claim 6, wherein the common plate comprises a set of multiple individual plates, each individual plate forming the second end of the corresponding electric field of a sensor plate of the three or more sensor plates.

12. The obscured feature detector of claim 11, wherein each of the multiple individual plates is independently activated.

13. An obscured feature detector comprising:
three or more sensor plates forming a sensor array, each sensor plate to capture a sensor reading that varies based on a proximity of the sensor plate to one or more surrounding objects and on a material property of each of the one or more surrounding objects, the three or more sensor plates to collectively create a sensing field, each individual sensor plate of the three or more sensor plates to create a corresponding primary sensing field zone within the sensing field where the individual sensor plate contributes more strongly to the sensing field than any other of the three or more sensor plates, the three or more sensor plates to create primary sensing field zones that are similar similarly responsive, wherein the primary sensing field zone corresponding to an end sensor plate is has a responsiveness similar to a responsiveness of the primary sensing field zone corresponding to a middle sensor plate;
a common plate to receive the primary sensing field zones, the common plate having a length that extends along a collective length of the sensor array, the length of the common plate being at most one and a half times a sensor width longer than the collective length of the sensor array,
a sensing circuit coupled to the three or more sensor plates, the sensing circuit configured to measure sensor readings of the three or more sensor plates, and detect a non-metallic object; and
an indicator to be toggled between a deactivated state and an activated state to indicate a location of a region of relative high sensor reading.

14. The obscured feature detector of claim 13, wherein the common plate configures the primary sensing field zone corresponding to an end sensor plate to have a responsiveness similar to a responsiveness of the primary sensing field zone corresponding to a middle sensor plate.

15. The obscured feature detector of claim 13, wherein the sensor array and the common plate are bilaterally symmetrical.

16. The obscured feature detector of claim 13, wherein the common plate is positioned to influence primary sensing field zones corresponding to end sensor plates to have a responsiveness similar to a responsiveness of primary sensing field zones of middle sensor plates.

17. The obscured feature detector of claim 13, further comprising an active shield that separates the group of three or more sensor plates from the common plate.

18. The obscured feature detector of claim 17, wherein the active shield is driven with a same potential as the sensor plates.

19. The obscured feature detector of claim 13, wherein the common plate comprises a set of multiple individual plates that each form a second end of the primary sensing field zones of a sensor plate of the three or more sensor plates.

20. The obscured feature detector of claim 19, wherein each of the multiple individual plates is independently activated.

21. The obscured feature detector of claim 13, wherein the common plate is more than 8.0 millimeters wide.

22. A method of detecting an obscured feature behind a surface, comprising:
taking a sensor reading of three or more sensor plates of an obscured feature detector that is disposed on a surface, the three or more sensor plates arranged linearly in a sensor array, the sensor reading of a region of a sensing field formed between the three or more sensor plates and a common plate of the obscured feature detector, wherein the three or more sensor plates are to create primary sensing field zones that are similarly responsive, wherein the common plate is sized and shaped to cause a sensing field of an end sensor plate to have a responsiveness similar to a responsiveness of a sensing field of a non-end sensor plate,
measuring, via a sensing circuit, the sensor reading of the three or more sensor plates;
comparing measurements of sensor readings in different regions of the sensing field; and
toggling an indicator from a deactivated state to an activated state to indicate a location of a region of the sensing field having a relatively high sensor reading to detect a non-metallic object.

23. The method of claim 22, further comprising driving an active shield of the obscured feature detector with a same signal as the three or more sensor plates to form the sensing field.

24. The method of claim 22, wherein the measured sensor reading is a capacitive reading.

25. The method of claim 22, wherein the measured sensor reading is an electromagnetic reading.

* * * * *

UNITED STATES PATENT AND TRADEMARK OFFICE
CERTIFICATE OF CORRECTION

PATENT NO. : 10,895,657 B2
APPLICATION NO. : 15/406322
DATED : January 19, 2021
INVENTOR(S) : David M. Dorrough and Daniel Scott Toborg Page 1 of 1

It is certified that error appears in the above-identified patent and that said Letters Patent is hereby corrected as shown below:

In the Claims

Column 27, Line 39 reads, "…field zones that are similar similarly…" which should read, "…field zones that are similarly…"

Column 27, Line 41 reads, "…to an end sensor plate is has a responsiveness" which should read, "…to an end sensor plate has a responsiveness"

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*